United States Patent [19]
Greenberg

[11] Patent Number: 5,867,312
[45] Date of Patent: *Feb. 2, 1999

[54] ILLUMINATION SYSTEM AND METHOD FOR A 3-D HIGH DEFINITION LIGHT MICROSCOPE

[75] Inventor: Gary Greenberg, Los Angeles, Calif.

[73] Assignee: Edge Scientific Instrument Company LLC, Santa Monica, Calif.

[ * ] Notice: The term of this patent shall not extend beyond the expiration date of Pat. No. 5,548,441.

[21] Appl. No.: 648,287

[22] Filed: May 15, 1996

Related U.S. Application Data

[63] Continuation-in-part of Ser. No. 29,461, Mar. 11, 1993, Pat. No. 5,548,441, and a continuation-in-part of Ser. No. 688,170, Apr. 19, 1991, Pat. No. 5,345,333.

[51] Int. Cl.$^6$ .............. G02B 21/06; G02B 21/18
[52] U.S. Cl. .............. 359/390; 359/385; 359/389
[58] Field of Search ................. 359/368–373, 359/379, 385–390, 464, 498–499, 502, 891

[56] References Cited

U.S. PATENT DOCUMENTS 3,712,199  1/1973  Songer, Jr. .............. 359/464
5,345,333  9/1994  Greenberg .............. 359/385
5,548,441  8/1996  Greenberg .............. 359/385

Primary Examiner—Thong Nguyen
Attorney, Agent, or Firm—H. Michael Brucker

[57] ABSTRACT

An illumination system and method for 3-D viewing and increasing resolution, sharpness, depth of field, and perception of depth for a light microscope including an objective lens having an optical axis, wherein one or more illuminating light beams are focused onto the specimen via paths that include the objective lens and are not coincident with the objective lens optical axis, and reflection beams follow paths that include the objective lens.

19 Claims, 14 Drawing Sheets

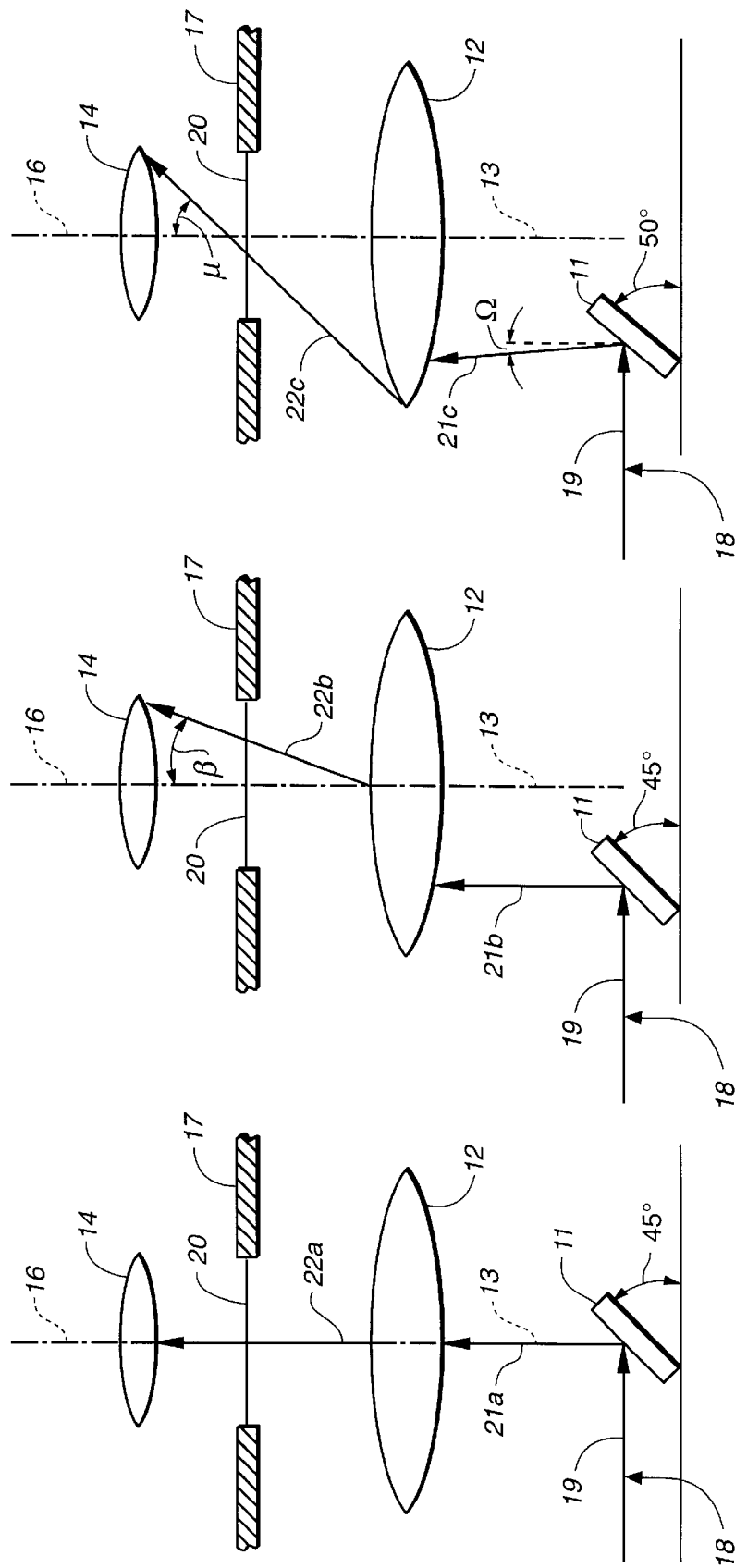

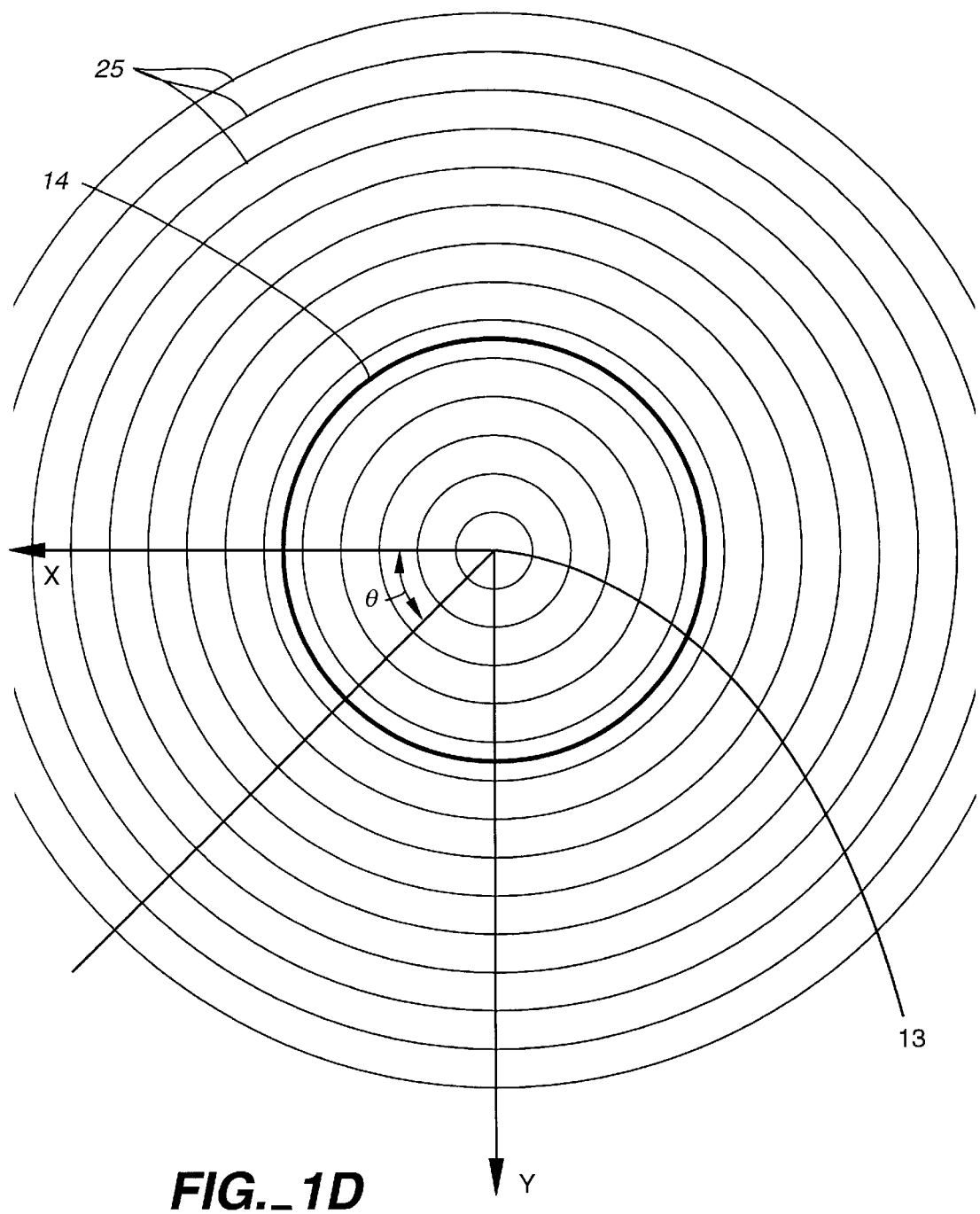
FIG._1D

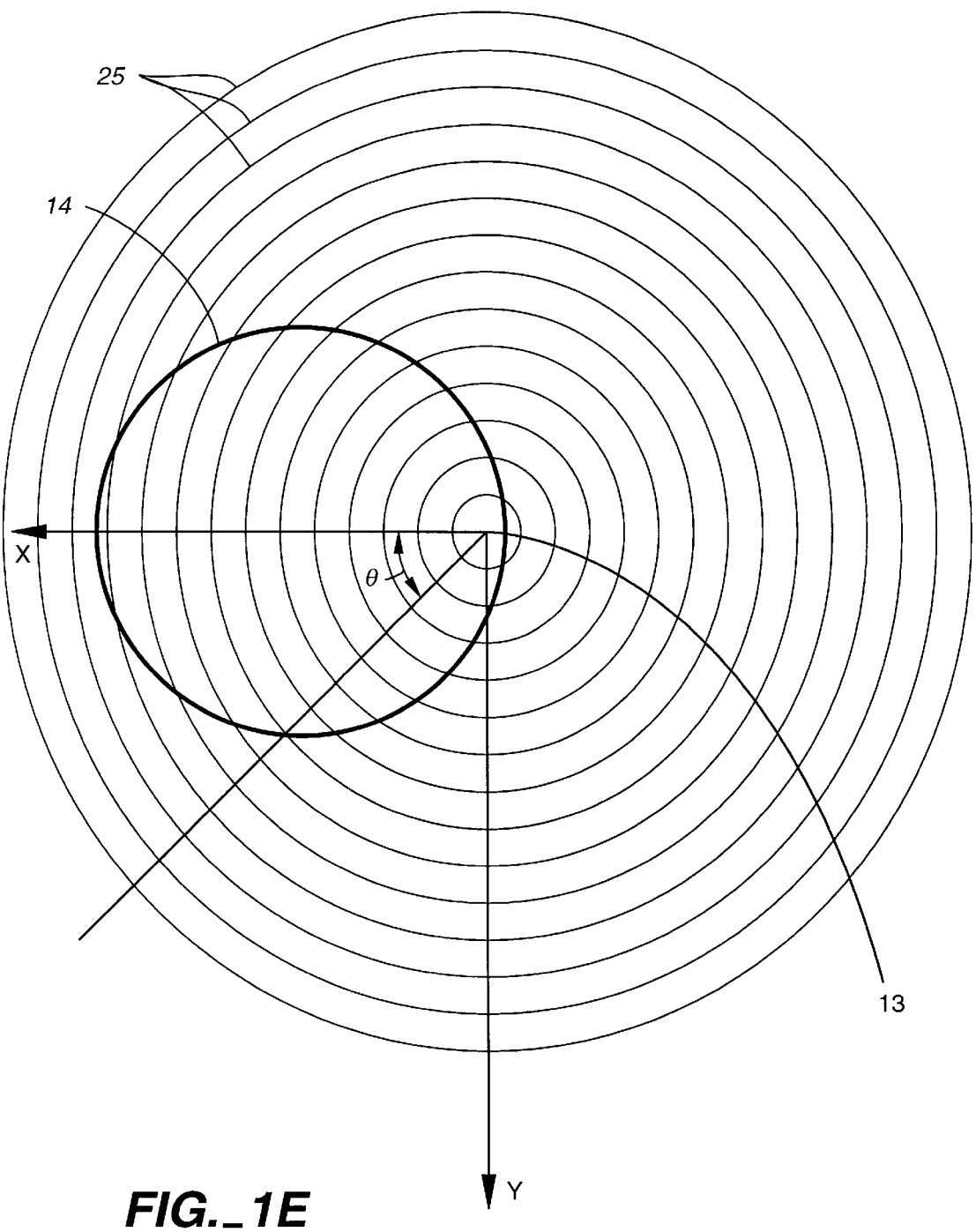
FIG._1E

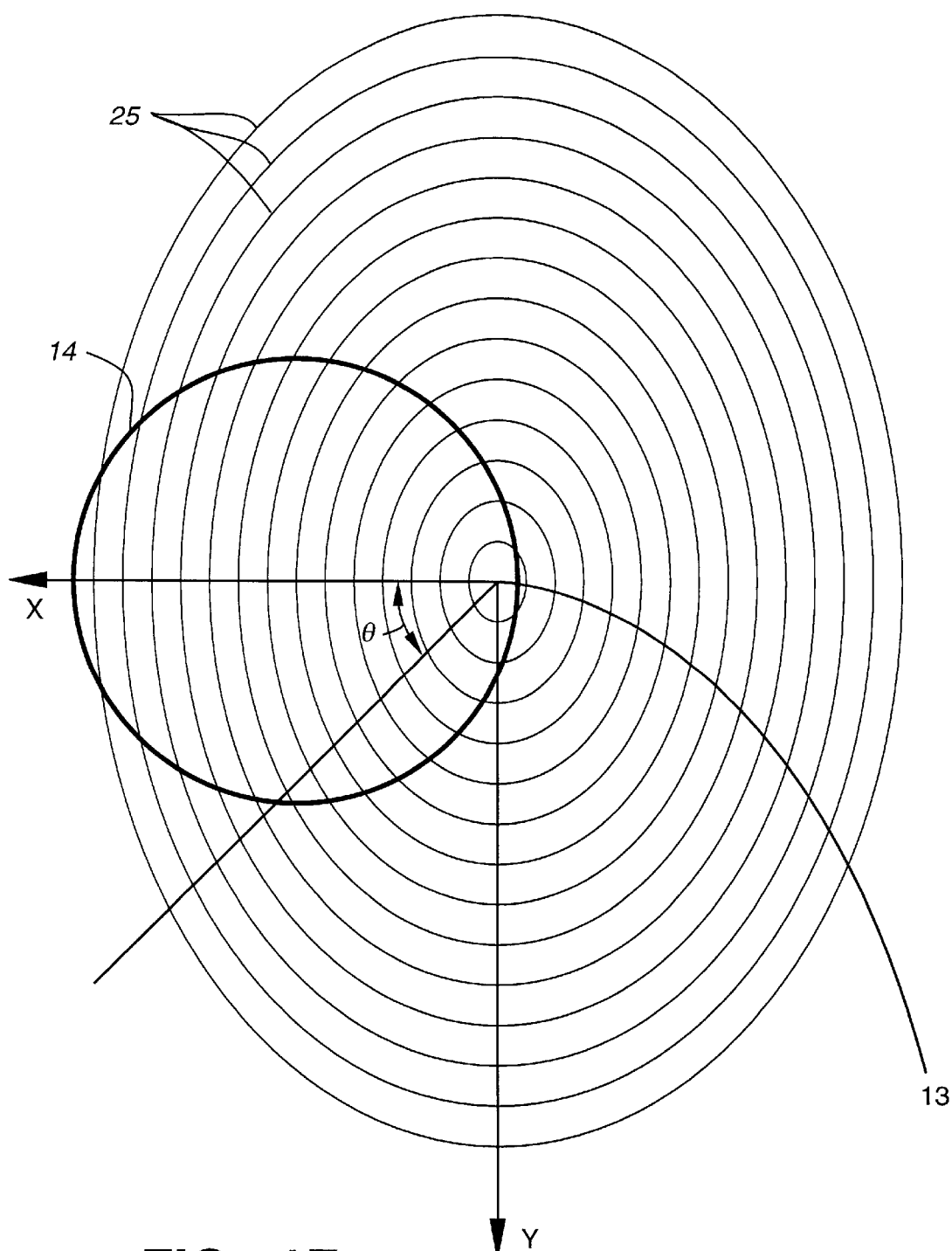
FIG._1F

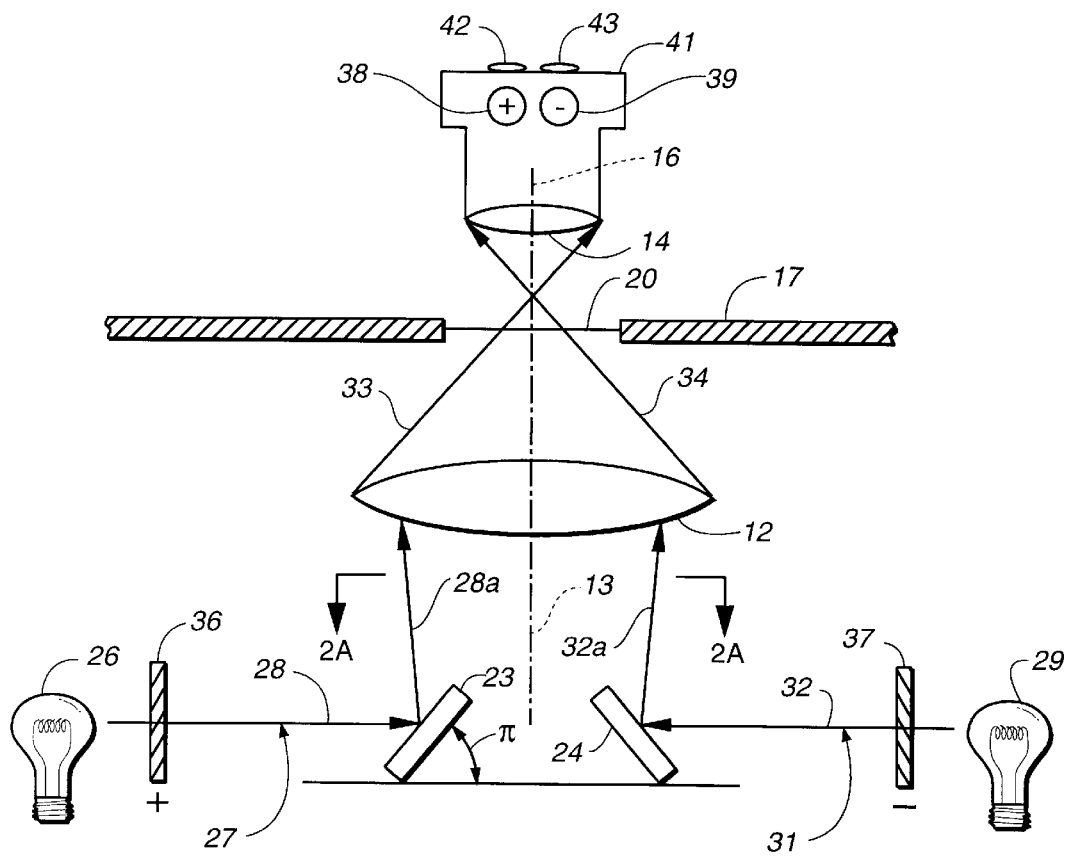
FIG._2
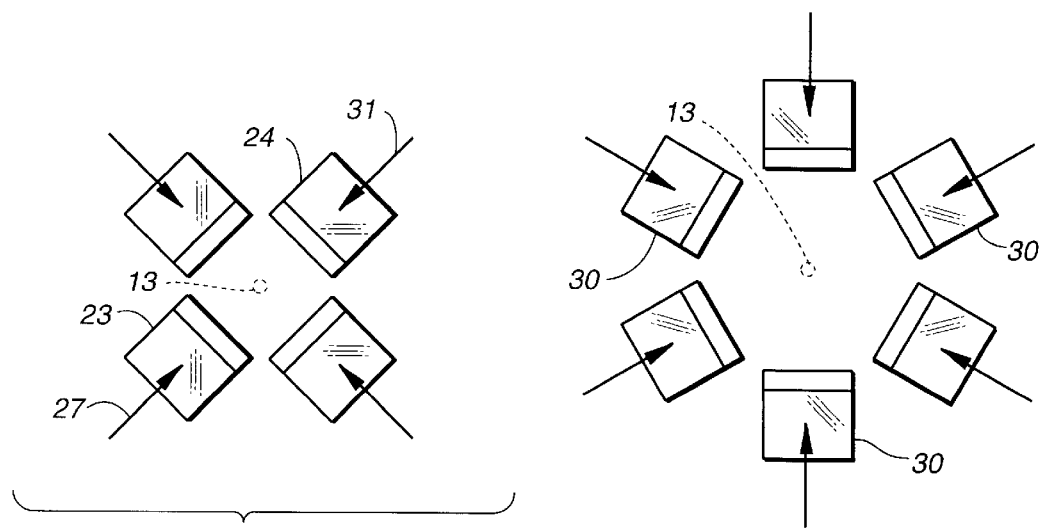
FIG._2D          FIG._2E

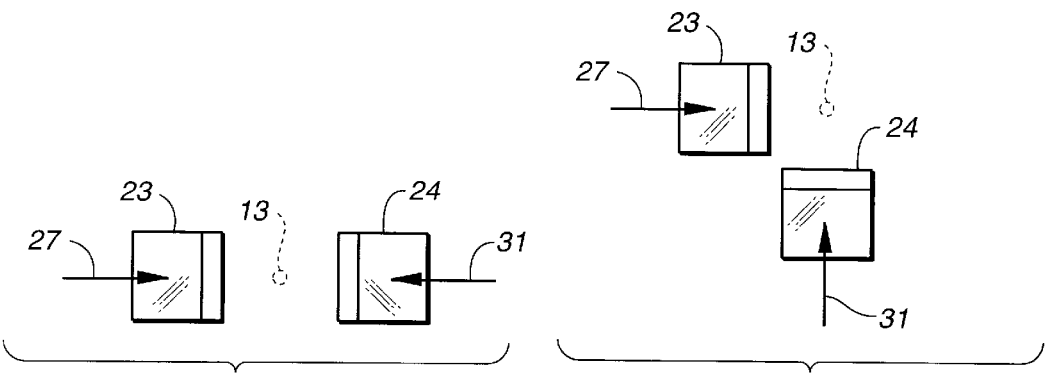
FIG._2A  FIG._2B
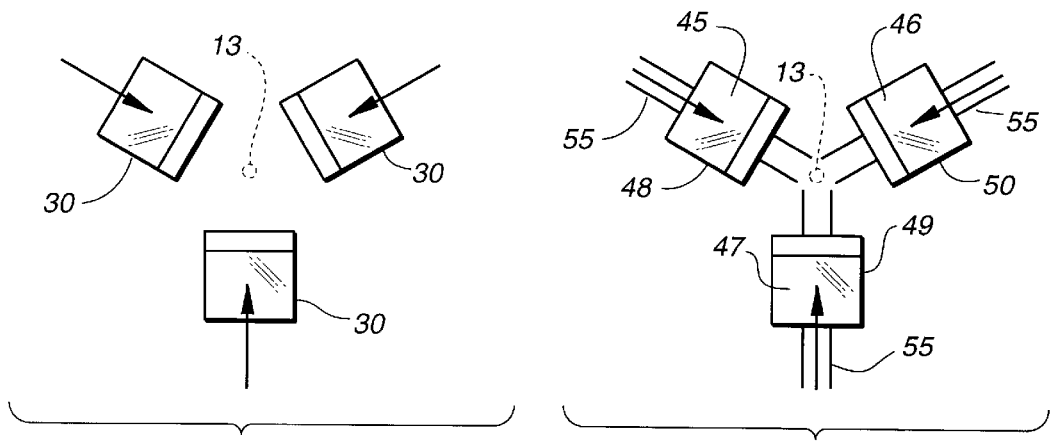
FIG._2C  FIG._3A
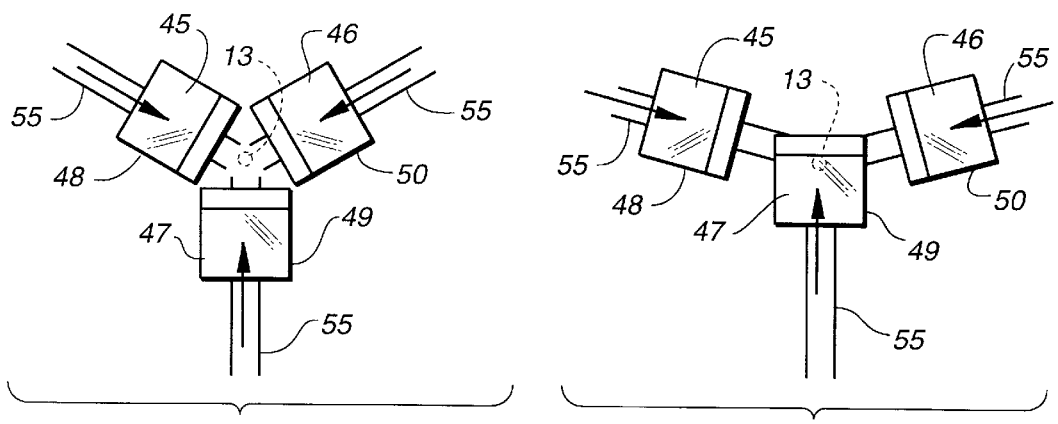
FIG._3B  FIG._3C

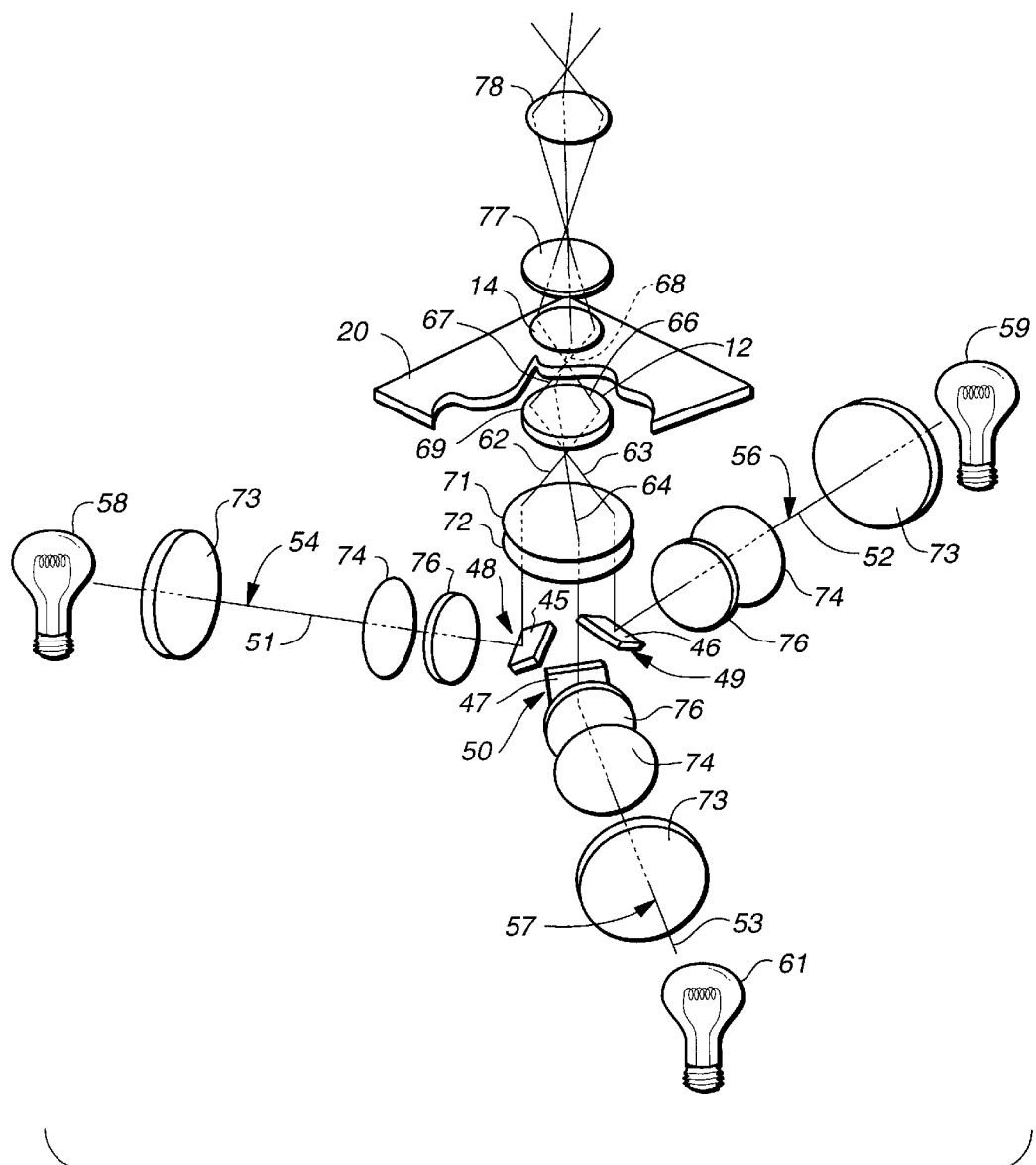
FIG._3

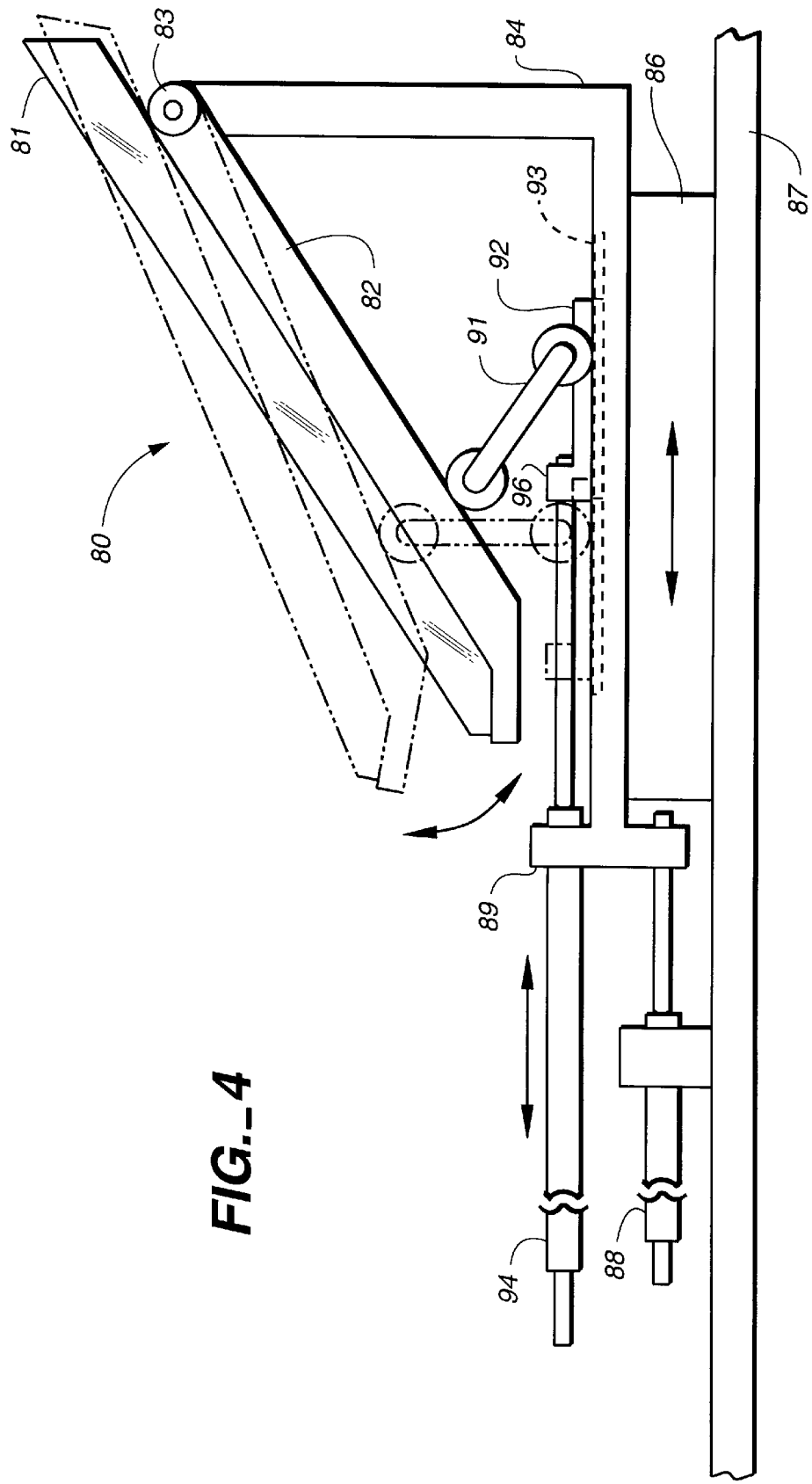
FIG._4

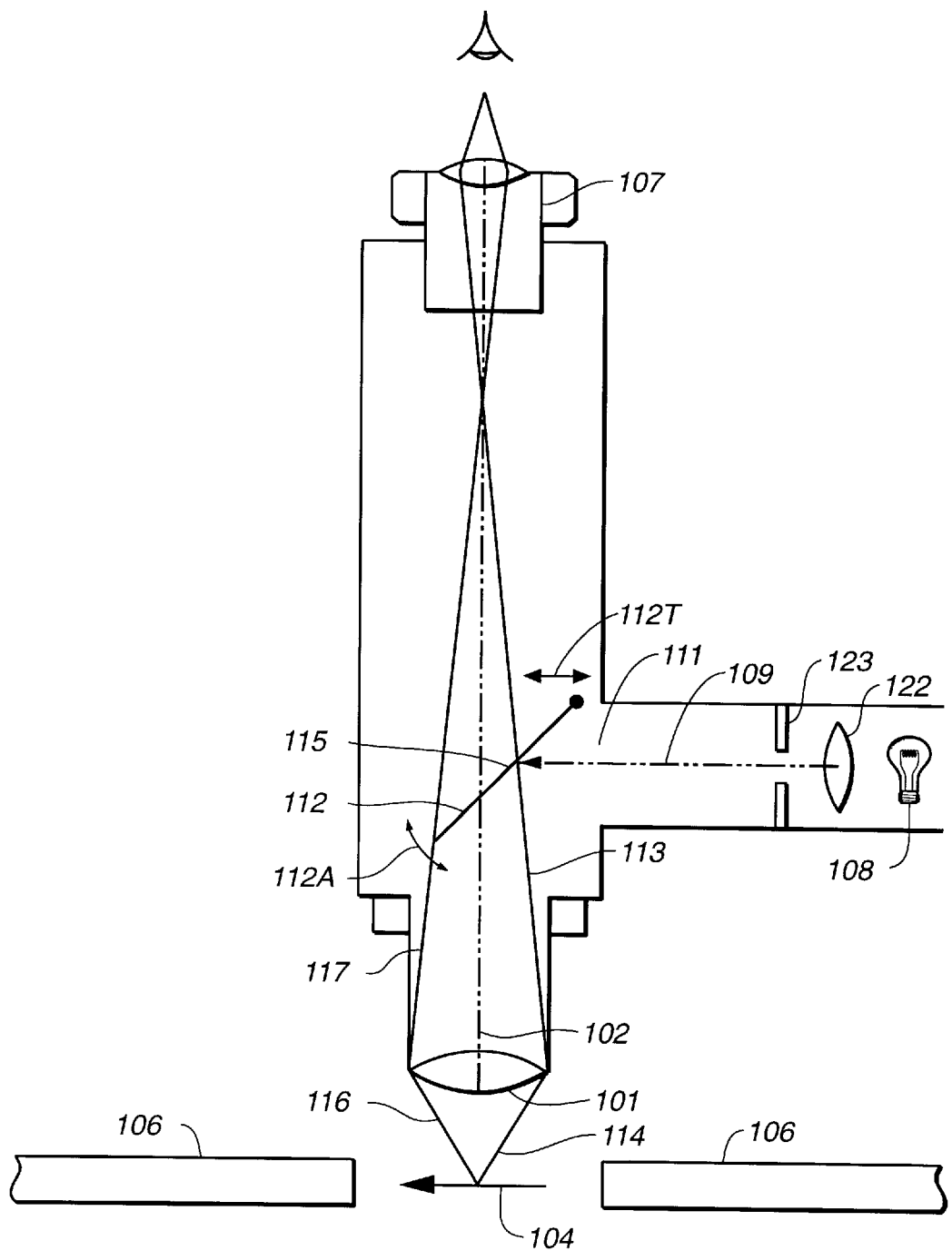
FIG._5

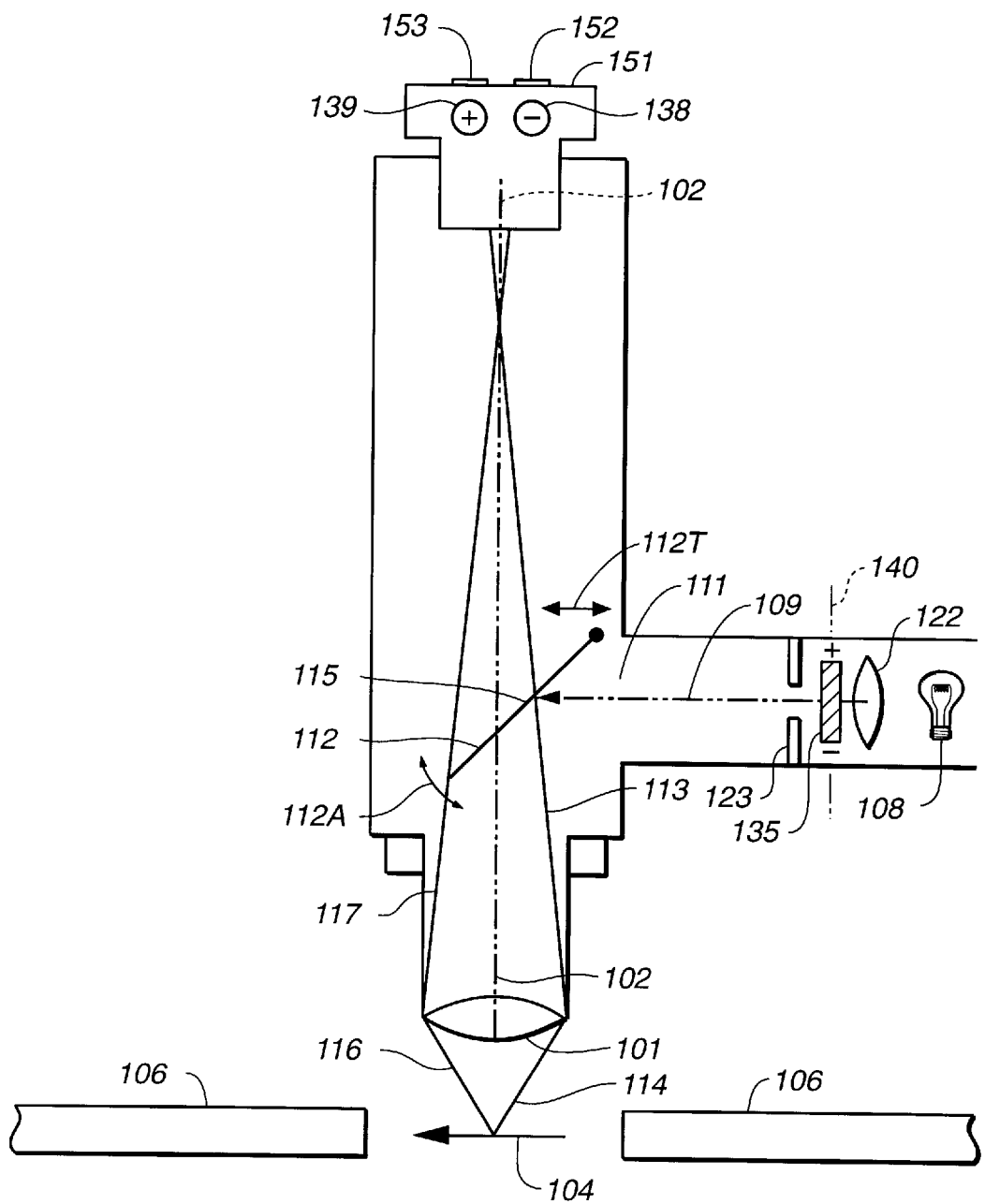
FIG._5A

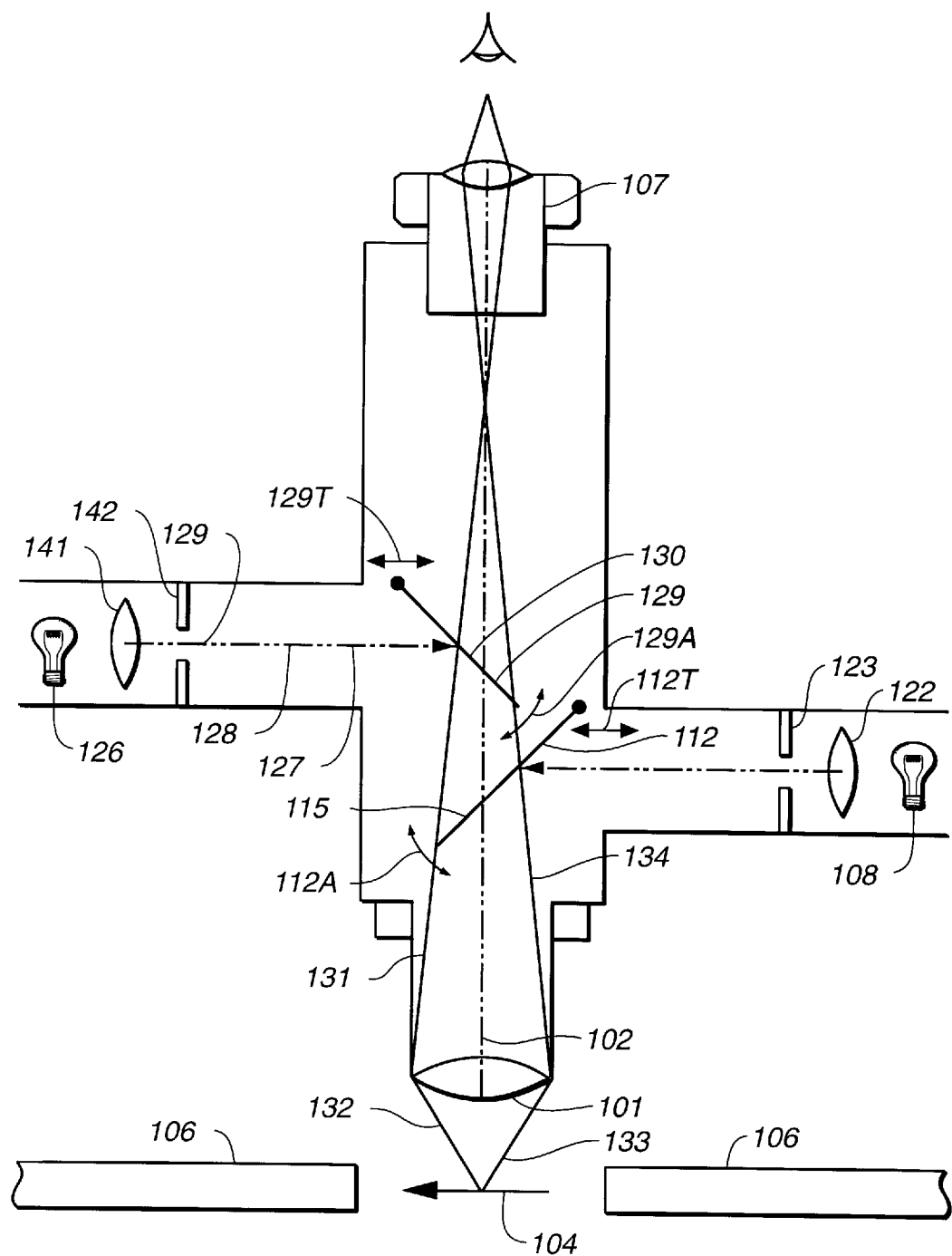
FIG._6

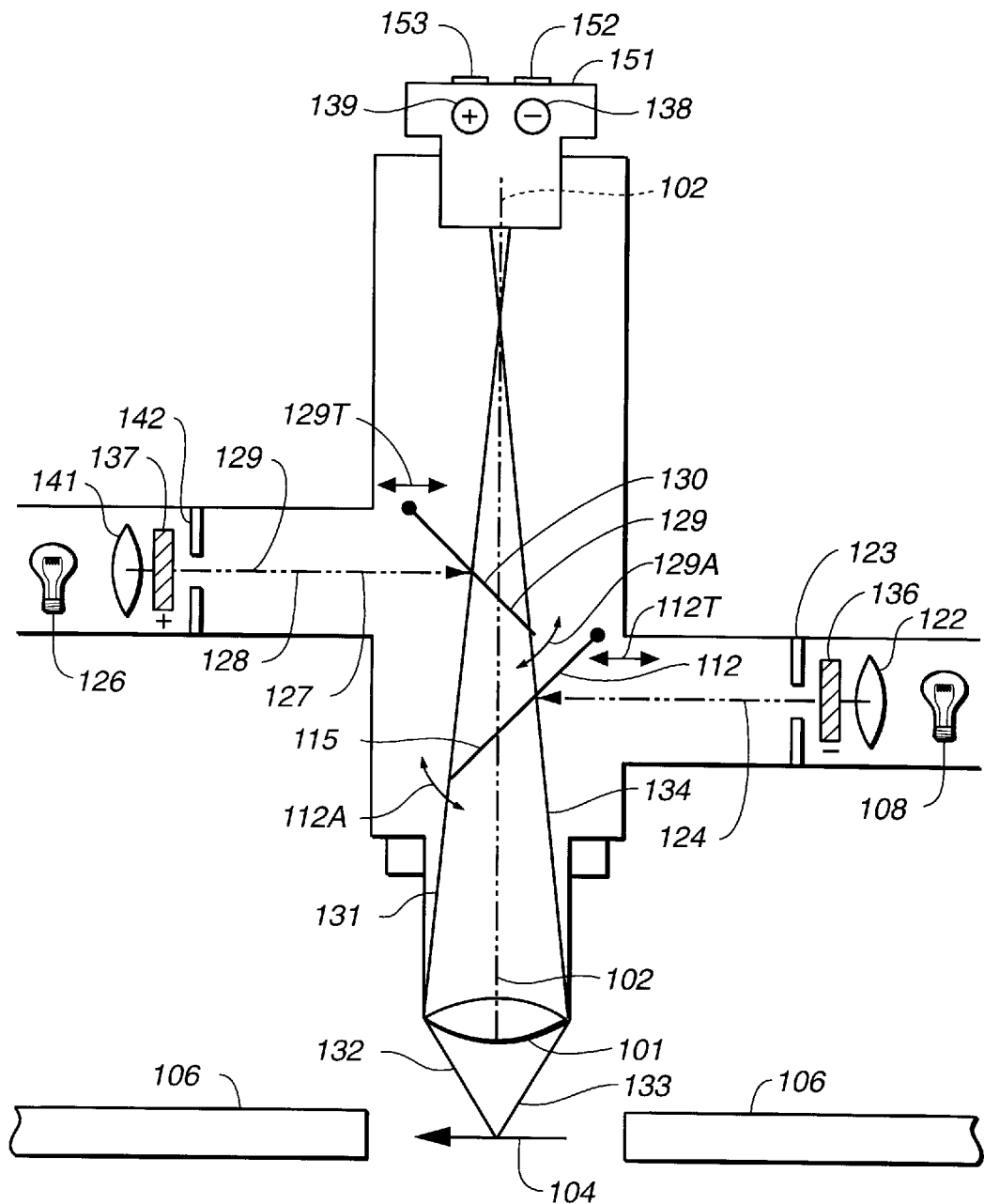
FIG._6A

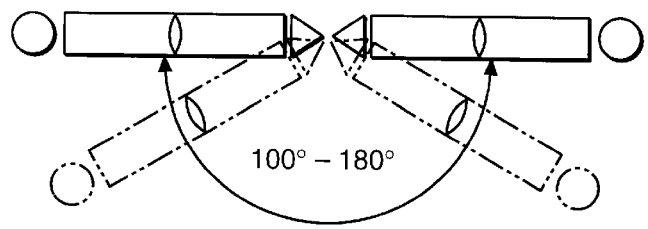
FIG._7A
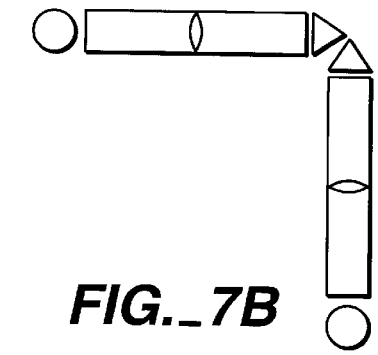
FIG._7B
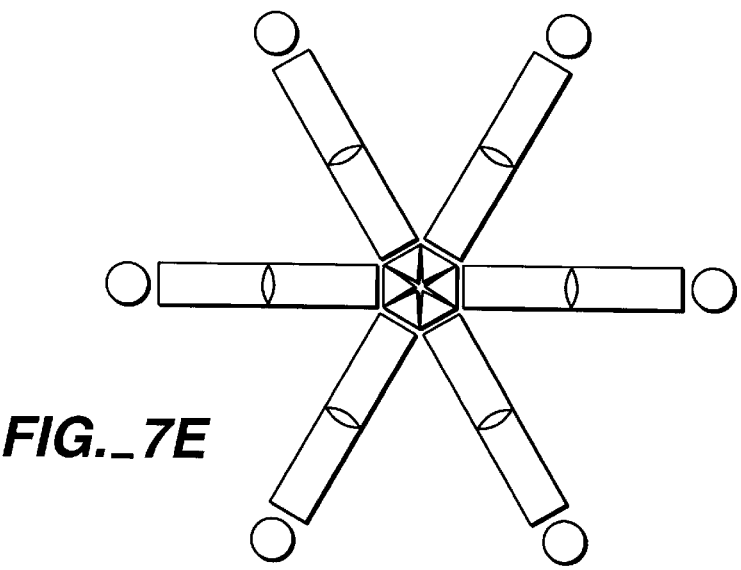
FIG._7E
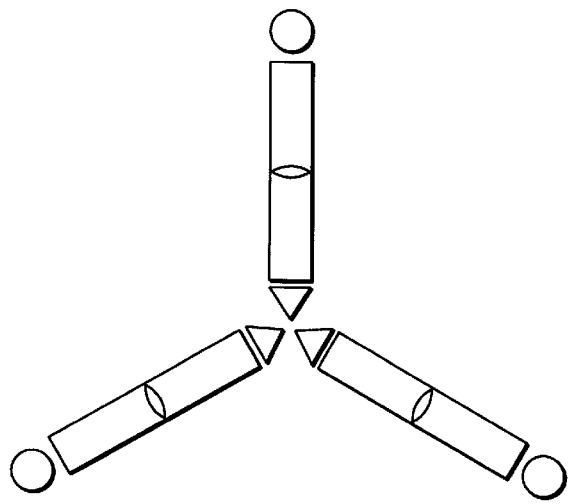
FIG._7C
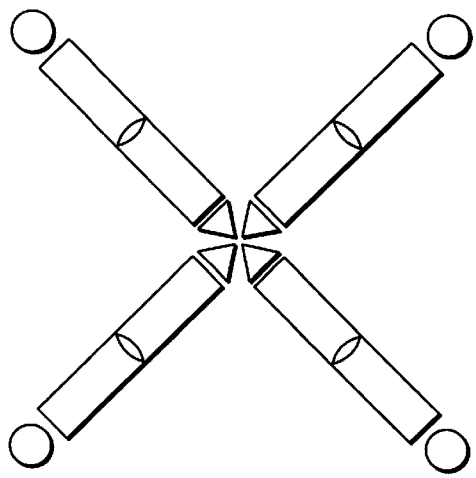
FIG._7D

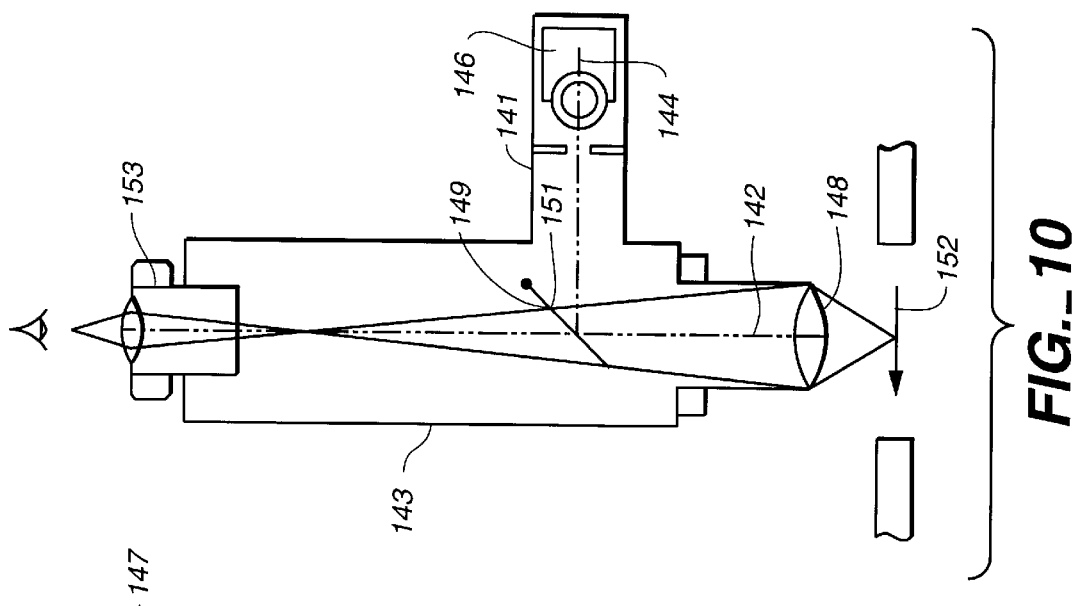
FIG._10
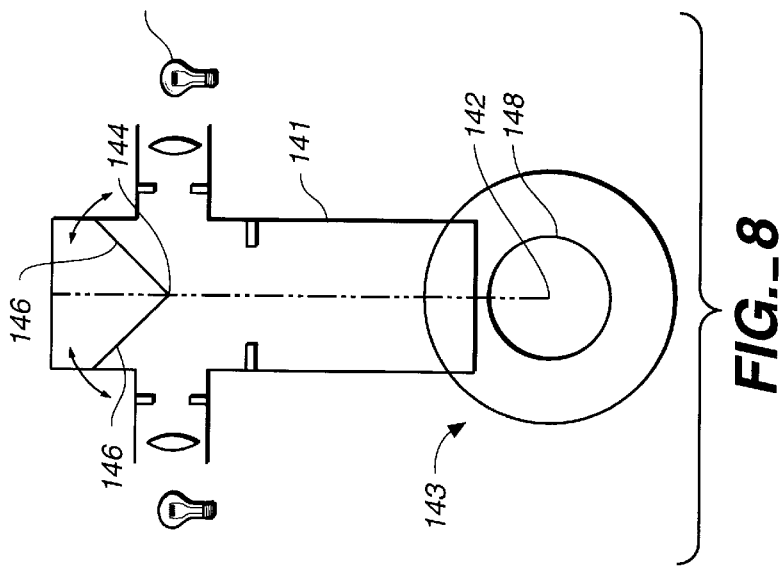
FIG._8
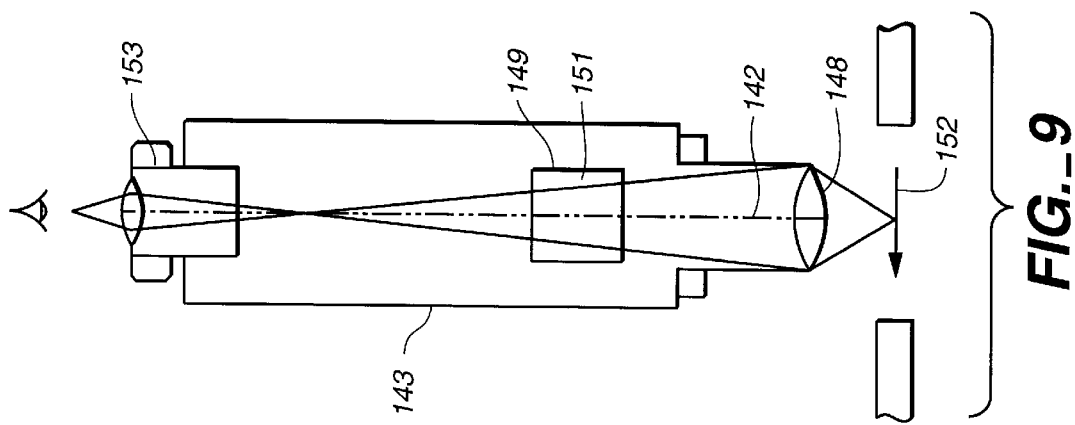
FIG._9

ILLUMINATION SYSTEM AND METHOD FOR A 3-D HIGH DEFINITION LIGHT MICROSCOPE

This application is a continuation of-in-part of my application Ser. No. 08/029,461 filed Mar. 11, 1993, now U.S. Pat. No. 5,548,441, which is a continuation of-in-part of patent of application Ser. No. 688,170, filed Apr. 19, 1991, now U.S. Pat. No. 5,345,333.

BACKGROUND OF THE INVENTION

1. Field of the Invention

This invention relates to illumination systems for light microscopes utilizing objective lens means and more particularly to such systems that utilize illuminating light directed at an oblique angle relative to the optical axis of the objective lens.

2. The Prior Art

The use with microscopes of what is commonly referred to as "oblique light" was of interest toward the end of the last century and the beginning of this, but the many devices designed for that purpose, although ingenious in some cases, have failed to survive. See *The Intelligent Use of the Microscope*, Oliver, C. W., Chemical Publishing Co., 1953.

Oliver carefully limits his meaning of "oblique light" to the "use of a narrow cone or beam of rays directed upon the object from any direction other than the optical axis provided it enters the object glass." Ibid. at 94. In this way he excludes from his discussion those systems that use rays directed onto a specimen from a direction other than the optical axis but which do not enter the object glass, as well as systems where the light does not enter the objective lens at an angle (such as systems that merely tilt the specimen stage). Illumination provided by systems in which the primary beam does not enter the objective is generally known and commonly referred to as "dark field" illumination as more fully discussed in *Photomicrography a Comprehensive Treatise*, Loveland, R. P., John Weily & Sons, Chapter 12. Although the present invention utilizes true oblique lighting as that term is used by Oliver, and is thereby clearly distinguishable from "dark field" systems, a brief description of "bright field" and "dark field" illumination will help to differentiate and more fully highlight the attributes of the present invention.

Illumination systems that direct rays onto a specimen along the optical axis create "bright field" illumination, so named because the rays passing through the field surrounding the specimen and entering the microscope objective are unimpeded and thus bright compared to the rays attenuated by passing through the specimen. In a "dark field" system, the relative brightness is reversed by directing only light rays onto the specimen field which are angled relative to the optical axis and directed to fall outside the objective aperture. All of the light passing through the specimen field surrounding the specimen is unimpeded and thus does not enter and is therefore not "seen" by the objective. Some of the light directed onto the specimen will be scattered, however, into secondary light rays, some of which will enter the objective (and be "seen"). Thus, the object appears brighter than the surrounding dark field. Such a system is described in U.S. Pat. No. 4,896,966.

The prior art contains a number of systems that combine "bright field" and "dark field" illumination for use both together and selectively, as illustrated in U.K. Pat. No. 887,230, and U.S. Pat. No. 4,601,551. In all of these systems the primary illuminating light is either aligned with the optical axis or angled to fall outside of the objective aperture.

The invention of U.S. Pat. No. 3,876,283, teaches the use of a system which uses true oblique lighting, by use of a prism located on the optical axis of a microscope condenser to laterally off-set an axial illumination beam to a path separate from the optical axis so as to direct the beam onto an off center location on the condenser lens. When a light beam parallel to the optical axis enters an off center location on a condenser lens, the beam will exit the lens at an angle to the optical axis. The degree of the angle is a function of the displacement of the beam from the center of the lens. When, as in patent '283, the angle is within the objective aperture, the system produces true oblique lighting as defined by Oliver (the light is "seen" by the objective). In order to achieve the maximum oblique angle for the beam, it must exit the condenser lens at or very near its periphery at an angle that is just within the objective aperture. While the teachings of patent '283 make this possible (by adding a wedge-shaped prism to the plano prism shown), each different condenser and objective combination will require a different pair of prisms to achieve a maximum angle. Otherwise, depending on the characteristics of the objective lens and condenser lens being used, it may be necessary, with the system of patent '283, to direct the laterally off-set beam onto the condenser lens at a location inwardly of its periphery in order to have the resultant exit angle within the objective aperture. In such cases, the maximum possible oblique angle will not be realized and, as will be explained below, the maximum resolution power of the system will not be achieved.

In patent '283, the location of the illuminating beam (between 15 and 17) and beam path shifting means 23 (prism) on the optical axis limits the system by permitting the use of only a single illumination beam. The references cited above are typical of the prior art in that they fail to recognize the real potential of oblique lighting to enhance resolution. Patent '283, in fact, does not acknowledge the resolution enhancing potential of oblique light, but instead cites as a reason for its use the casting of shadows to highlight uneven areas of the specimen. It is not, therefore, necessarily an object or desideratum of patent '283 to provide a maximum oblique angle (for example, too much shadowing might obscure details). But, one of the requirements of realizing the full potential of oblique lighting to dramatically enhance resolution is that the angle of the oblique light be maximized. For a single beam system, maximum resolution is achieved for a given condenser lens/objective lens combination by having the illumination beam exit the condenser lens' periphery so that the light illuminating the object is at a maximum oblique angle and still within the objective aperture. By making it possible to adjust the angle at which the beam exits the condenser lens independently of the location where it exits, the angle of the light (relative to the optical axis of the objective lens means) illuminating the specimen can be fully maximized. Likewise, by being able to adjust the location where the beam exits the condenser independently of the angle at which it exits, any condenser can be used to its fullest potential. With the ability to so adjust the angle and location of the beam exiting the condenser lens, a large condenser lens (high numerical aperture) can be used to achieve maximum oblique lighting for most objective lenses.

The present invention teaches that the essential requirement for realizing the maximum potential of true oblique lighting is the ability to direct two or more separate and distinct light beams onto the objective wherein each beam is at the maximum angle to the objective axis that permits the illumination to enter the objective. This, of physical necessity, requires that the beam shifting means be located off the optical axis of the objective. Also, the present invention overcomes the anisotropy that is found in prior art oblique illuminating systems.

In addition, the present invention teaches a real time, 3-D system using multiple beams, which goes far beyond what can be achieved with a single beam, such as that described in U.S. Pat. No. 4,072,967. Patent '967 teaches how to achieve a 3-D image using a microscope with a single condenser lens and a single objective lens, by placing complimentary filters across the left and right halves of the condenser lens and placing a complementary filter set in the binocular eyepieces. With this type of system, the degree of parallax is fixed. Furthermore, there is very little disparity in parallax between the left and right images, especially at the center of the image field. In contrast, with the present invention, the left and right images are independently controlled and the degree of parallax between them can be easily adjusted to match the type of objective being employed and the type of specimen being viewed. In addition, there is another and possibly even more important advantage with the present invention, which is the ability to achieve a greater depth of field without loss of resolution, as is more fully explained below. This is a critical prerequisite for producing a sharp 3-D image.

SUMMARY OF THE INVENTION

The present invention resides in the illumination system for a light microscope characterized by objective lens means (which can be comprised of several lenses). The objective lens means is located between the viewing means and the illuminated object or specimen.

The diffraction theory of microscopic vision teaches that when examining an object having very closely spaced structural details such as the markings of the diatom *Amphipleura pellucida*,, the image of a single point or line of detail will consist of a central beam surrounded by a number of spectra (sometimes referred to as orders of diffraction wavelets). The number and arrangement of the spectra depend on the pattern of the markings and the wave length of light being used. The distance of the diffraction wavelets from the central beam is greater the finer the markings on the specimen (the smaller the spacing between structural details).

The diffraction theory further teaches that in order to obtain any image of the specimen, it is necessary to collect and recombine at least one order of wavelets with the central beam. The more successive orders of wavelets recombined with the central beam, the more the resolution and sharpness of the image increases.

Using an axial illuminating beam on an object such as the diatom *Amphipleura pellucida* creates spectra that are so far out from the central beam that the highest existing aperture is insufficient to include any of them. The specimen's markings remain unresolved and thus invisible.

The use of oblique lighting can result in the inclusion of one or more orders of wavelets for a specimen which, when illuminated by axial lighting, casts all of the orders of wavelets beyond the objective. The greater the angle of the oblique light, the greater the number of orders of wavelets included within the objective aperture and thus the greater the resolving power of the system. In fact, both the resolution as well as the sharpness of the image can be significantly increased compared to axial illumination, because the optimal oblique illumination will place the zero order wavelet near the edge of the objective aperture and thus the objective can recombine more orders of diffraction wavelets for any given structural detail.

Accordingly, it is a principal object of the present invention to provide an illumination system and method for a light microscope which produces oblique lighting, thereby enhancing the microscope's resolving power and sharpness of image.

In conjunction with the object stated above is an object of the invention when used with a transmitted light microscope or a reflection microscope to utilize the entirety of the source beam or beams as illumination sources for the specimen. That is to say, that the present invention, unlike so much of the prior art, does not use a mask on the condenser or between the objective and the specimen to create an oblique light beam from a small portion of the source beam.

It is a further object of the invention to provide for a transmitted light microscope having a condenser lens or a reflection microscope without a condenser lens, an illumination system which produces an oblique light beam which is independently selectively adjustable in both its location and angle relative to the optical axis of the objective lens.

It is another object of the invention to provide for a reflection light microscope having an objective lens, an illumination system which produces an oblique light beam which is independently selectively adjustable in both the location and angle at which it passes through the objective lens.

While the use of a single illuminating beam according to the present invention achieves results which can surpass the prior art in terms of resolution and is within the scope of the invention, the maximum potential of oblique lighting is achieved in the present invention when a plurality of independent beams are used. Specifically, while a single beam system produces enhanced resolution, it does so predominantly along the direction of the beam axis (projected onto the specimen plane). Furthermore, at 90 degrees to that axis, there is a significant decrease in resolution and sharpness. For example, in order to see the detailed pattern of Amphipleura Pellucida, the specimen must be rotated on the stage so that the markings are oriented along the axis of the oblique illuminating beam. As the specimen is rotated away from that optimal position, the markings become less distinct and finally disappear altogether. As the specimen is rotated further, the markings become visible again as the orientation approaches 180 degrees. This is a result of the fact that while a single oblique beam increases resolution along an X dimension, it decreases resolution along the perpendicular Y dimension. If, however, two oblique beams illuminate a specimen so that their angle of orientation is 90 degrees apart, then the image resolution and sharpness is increased in both the X and Y dimensions. Enhanced resolution over essentially the entire specimen plane is achieved using multiple oblique illuminating beams radially spaced about the optical axis of the condenser. As a result, very fine structural details such as the markings on *Amphipleura Pellucida* can be seen regardless of how the specimen is oriented on the stage.

When multiple beams are used, enhanced resolution is derived not only from the benefits of oblique illumination, but also from the overall increase in the system's N. A. (numerical aperture) that results from multiple beams following different oblique paths to the objective. That is, the "working" N.A. of the beam is increased beyond its normal potential because a highly oblique beam of light will approach the objective lens at a greater angle than will a normal axial beam. For each beam, the increased angle will only be on one side of the objective, while the angle will be deficient on the opposite. If however, a second oblique light beam is directed onto the objective at the opposing angle relative to the first beam, then both sides of the objective will see a beam with a greater angle than would be possible with a single central light beam. Thus, multiple oblique light beams can be directed onto an objective lens at opposing angles relative to the optical axis such that the beams will combine to form an overall increase in the aperture of illumination and thus, an increase in the overall resolution of the system. The final resolution of the image is dependent on the N.A. of the system. For microscopes using a condenser lens along with an objective lens, the N.A. of the system will be the combination of the N.A. of objective and condenser lenses.

Thus, another object of the invention is to provide an illumination system and method for a light microscope utilizing a plurality of independent, separate illuminating light beams directed onto an objective lens wherein each light beam follows a path to the objective which is oblique relative to the objective's optical axis.

Another object of the invention is to provide an illumination system and method for a reflection light microscope wherein a plurality of independent, separate illuminating light beams are directed through an objective to illuminate a specimen wherein each light beam follows a path that is oblique relative to the objective's optical axis.

Another object of the invention is to provide an illumination system for a light microscope utilizing a plurality of independent, separate illuminating light beams directed through an objective lens wherein the path of each light beam is independently adjustable in both its location and angle. Such a system enjoys, in addition to the advantages already stated, the advantage of being able to significantly increase the depth of field without degradation of resolution.

It is well known that in a conventional illumination system for a microscope, reducing the condenser aperture to increase depth of field and contrast reduces resolution. A known alternative method for increasing depth of field is to slightly under focus the condenser lens (keeping the condenser aperture fully open) while closing a field stop iris to increase depth of field. If a single illuminating beam is used, whether it be axial or oblique, then the increase in depth of field will be accompanied by a decrease in resolution. In the present invention, multiple oblique beams are directed onto the condenser so that even when the field lens aperture is reduced to increase depth of field and contrast, resolution is not degraded. This follows because overall aperture of illumination at the condenser lens, which continues to receive and transmit light beams from its full aperture, has not been reduced. Put in another way, the final image is the combination of multiple images, each with extended depth of field created by an array of pre-apertured oblique illuminating beams, which have an additive effect on the overall aperture of illumination. The same benefit inures to the reflection embodiment of the present invention.

Yet another object of the invention is to provide means for using double oblique lighting in a light microscope having an objective lens which produces enhanced resolution and real time 3-D viewing with extended depth of field.

By utilizing separate independent illuminating light beams, it is possible in the present invention to manipulate each beam independently if desired, such as by interposing complementary filters and thereby produce true, real time 3-D viewing. The interposition of polarizing filters in the path of one or more beams permits a variety of effects, such as selective shadow rotation, to be achieved at the same time that enhanced resolution is realized.

Other objects of the present invention will in part be obvious and will in part appear hereafter.

A significant part of the present invention teaches how to realize the maximum potential of oblique illumination by directing two or more separate and distinct oblique light beams onto the objective lens in a variety of configurations in order to achieve results which would not be possible with a single illuminating beam. Some of those configurations will be illustrated and their advantages discussed. However, there are other possible configurations that will not be specifically discussed but still fall within the scope of these teachings.

BRIEF DESCRIPTION OF THE DRAWINGS

The foregoing and other objects, aspects and advantages of the invention will be better understood from the following detailed description of the preferred embodiment of the invention with reference to the drawings in which:

FIG. 1A is a schematic diagram of microscope optical elements (including a condenser lens and an objective lens) wherein the illumination path is coincident with the axes of the lenses;

FIG. 1B is a schematic diagram of the microscope optical elements of FIG. 1A wherein the illumination path is parallel to but not coincident with a condenser lens and oblique to the objective lens;

FIG. 1C is a schematic diagram of the microscope optical elements of FIG. 1A wherein the illumination path is non-coincident with and oblique to the axes of both lenses;

FIG. 1D is a wave diagram illustrating the relative number of orders of wavelets that can be seen by the objective lens by the illumination arrangement of FIG. 1A;

FIG. 1E is a wave diagram illustrating the relative number of orders of wavelets that can be seen by the objective lens by the illumination arrangement of FIG. 1B;

FIG. 1F is a wave diagram illustrating the relative number of orders of wavelets that can be seen by the objective lens by the illumination arrangement of FIG. 1C;

FIG. 2 is an optical schematic illustration of a two beam embodiment of the invention;

FIGS. 2A and 2B are plan views illustrating two possible mirror arrangements for the embodiment of FIG. 2;

FIG. 2C is a plan view illustrating a three mirror configuration;

FIG. 2D is a plan view illustrating a four mirror configuration:

FIG. 2E is a plan view illustrating a six mirror configuration:

FIG. 3 is an isometric, optical schematic illustration of a three beam embodiment of the invention;

FIGS. 3A, 3B and 3C are plan views of the mirrors of FIG. 3 in varying arrangements;

FIG. 4 is an isometric illustration of a beam shift means of the invention;

FIG. 5 is an optical schematic illustration of a single beam illumination system of the present invention for a reflection microscope;

FIG. 5A is the same as FIG. 5, with the addition of complementary filter components to permit 3-D viewing;

FIG. 6 is an optical schematic illustration of a dual beam illumination system of the present invention for a reflection microscope;

FIG. 6A is the same as FIG. 6, with the addition of complementary filter components to permit 3-D viewing.

FIG. 7A is a plan view illustrating a two beam illumination configuration of a reflection microscope of the present invention wherein the beams are 100°–180° apart;

FIG. 7B is a plan view illustrating a two beam illumination configuration of a reflection microscope of the present invention wherein the beams are 90° apart;

FIG. 7C is a plan view illustrating a three beam illumination configuration of a reflection microscope of the present invention wherein the beams are evenly spaced about the optical axis of the objective means;

FIG. 7D is a plan view illustrating a four beam illumination configuration of a reflection microscope of the present invention; and FIG. 7E is a plan view illustrating a six beam illumination configuration of a reflection microscope of the present invention;

FIG. 8 is a front view optical schematic illustration of a multiple beam illumination system of the present invention for a reflection microscope with an off-set light source;

FIG. 9 is a top view of the embodiment of FIG. 8; and

FIG. 10 is a side view of the embodiment of FIG. 8.

DESCRIPTION OF PREFERRED EMBODIMENTS

An important aspect of the present invention is best described with reference to FIGS. 1A–1C wherein a light beam path shift means (mirror) 11, a condenser lens means 12 having an optical axis 13, an objective lens means 14 having an optical axis 16, and a specimen support stage 17 disposed between the condenser 12 and the objective 14 and defining a specimen plane 20, are the basic components of a transmitted light microscope illumination system. While the principles of the invention are herein illustrated in connection with a transmitted light embodiment of the invention, the principles apply equally with regard to reflection microscopes as more fully described below.

The support stage 17 holds a specimen (not shown) to be illuminated by light beam 18 from a light beam source means (not shown). The axis 13 of the condenser 12 and the axis 16 of the objective 14 are shown as being coincident, which is the most common arrangement for transmitted light microscopes. Such axial coincidence is not required by the present invention, however, which is equally operative in a system where, for example, the condenser is tilted relative to the objective. Although both the condenser means 12 and the objective means 14 are each shown diagrammatically as a single lens, it will be understood by those skilled in the art that the condenser means and the objective means may be comprised of multiple lens elements, as well as other optical devices known in the art.

When, as shown in FIG. 1A, the mirror 11 is positioned on the condenser axis 13 and disposed at a 45 degree angle relative to the initial path 19 of beam 18, which is normal to the condenser axis 13, the path 21a of the beam after being shifted by the mirror 11 will follow the axis 13.

Unless otherwise stated, lines indicated as representing a beam path, such as 19 and 21a, are schematic representations of a beam's axis. In reality, of course, a beam has an envelope which can be converging, diverging or parallel. An understanding of the present invention is best facilitated, however, by following the path of a beam's axis.

As is well known, a beam incident a condenser such as 12 along its axis 13 will emerge from the lens along an axial path 22a. For the arrangement of FIG. 1A, the beam path 22a will pass through the specimen plane 20 at right angles thereto and include the objective lens 14 along its axis 16. FIG. 1A represents a typical "bright field" illumination system.

When mirror 11 is laterally displaced from the axis 13 of condenser 12 while being maintained at a 45 degree angle, as shown in FIG. 1B, the shifted beam path 21b remains parallel to condenser axis 13 but is laterally displaced therefrom. The effect of the beam path 21b entering condenser 12 at an off axis location is to create an angle β between the exit beam path 22b and the objective axis 16. However, the exit location of the beam 22b from the condenser means 12 is not laterally displaced from the condenser optical axis 13.

Since the specimen plane 20 is at right angles to the objective axis 16, the beam path 22b will be angled or oblique to a specimen in the specimen plane 20. For the purposes of the present invention, however, the important relationship is the angle β between the exit beam path 22b from the condenser 12 and the optical axis 16 of the objective 14. The advantages of the present invention do not, for example, accrue from a system that creates an oblique angle between the specimen plane and the illuminating beam path by tilting the specimen stage while at the same time allowing the illuminating beam to travel a path that is parallel to the objective axis. Such an arrangement still produces standard "bright field" illumination enhanced only by some possible shadowing.

Referring to FIG. 1C, mirror 11 is inclined relative to the path 19 of incident source beam 18 to be greater than 45 degrees (50 degrees for example), causing an angle of reflectance for the beam that sets the beam path 21c to the condenser means 12 at an angle Ω relative to the optical axis 13 of the condenser means. The effect of beam path 21c entering condenser 12 at an angle Ω is to laterally shift the location of the exit beam path 22c from the center of the condenser lens means 12 to some location nearer the periphery. Thus, by changing the angle of the mirror 11 relative to the beam path 19, as well as laterally displacing it off of axis 13, as shown in FIG. 1C, the beam path shift means 11 is operative not only to control the angle of the exit path 22c, but its location on the condenser 12 as well. Under these circumstances, the angle of oblique illumination is increased (angle μ in FIG. 1C is greater than angle β in FIG. 1B). Thus, the angle of the exit beam path 22c from the condenser 12 is a function of the lateral (radial from axis 13) displacement of the incident beam path 21c, while the lateral (radial from axis 13) position of the exit beam path 22c on the condenser 12 is a function of the angle of the incident beam path 21c relative to the axis 13 of the condenser means 12.

One of the desiderata of the present invention is the manipulation of the beam path shift means 11 to maximize the angle of the exit beam from the condenser within the limits of the aperture of the objective. This will depend on the specification of the lenses, such as the focal length, working distance and numerical aperture.

The maximum oblique angle of the beam path 22c relative to the objective axis 16 within the objective aperture is achieved by having the beam path exit the condenser at or very near the edge of the condenser lens 12. This is achieved by varying the angle of mirror 11 relative to the source beam path 19 and thereby the angle Ω of the beam path 21c to the condenser. At the same time, in order to create true oblique lighting, all or a portion of the beam must enter the objective, requiring that for a particular objective, the exit beam path from the condenser be at a particular angle as well as location. And, as explained above, the angle μ is varied as a function of the radial location of the mirror 11 and thereby the radial location of the entering beam path 21c relative to the condenser optical axis 13.

One of the advantages that accrues to the present invention is that condensers of maximum size can be advantageously used in most systems since the beam path shift means permits the angle Ω of the exit beam path from the edge of the condenser to be shifted until it includes the objective. In this way, the best glass can be used and the maximum beam path angle achieved with the result of greatly enhanced resolution. Furthermore, in the present invention, unlike prior art systems, most of the optimally angled light beam can enter the objective rather than merely just an edge or small portion of the light cone, thereby creating the brightest possible image for the available light.

While the single beam system described above is capable of greatly enhancing a microscope's resolution, the improved resolution is primarily along the direction of the axis of the illuminating beam (as projected onto the specimen plane), with the resolution along a direction 90 degrees thereto being significantly degraded.

Resolution and sharpness are ultimately dependent upon the number of orders of diffraction wavelets that can be collected and recombined by the objective lens. FIGS. 1D, 1E and 1F illustrate the relative number of orders of wavelets that can be seen by the objective lens under the illuminating conditions shown in FIGS. 1A, 1B and 1C, respectively. In FIG. 1E, which corresponds to the oblique illuminating conditions of FIG. 1B, the objective lens collects and recombines more orders of diffraction wavelets 25 than shown in FIG. 1D which corresponds to the axial illuminating system of FIG. 1A. However, the increase in the order of wavelets collected in the X dimension is linked to a decrease in the order of wavelets collected in the Y dimension. This increase (or decrease) in resolution relative to the resolution attainable with axial illumination is proportional to 2 times the cosine of angle Ø, where angle Ø is the angle of orientation of the specimen (not shown) relative to the axis of the oblique illumination. Angle Ø ranges from 0 to 90 degrees, where 0 degrees is the X dimension (or the axis of oblique illumination) and 90 degrees is the Y dimension.

In FIG. 1F, which corresponds to the maximum oblique illuminating conditions, as shown in FIG. 1C, the number of diffraction wavelets 25 collected and recombined by the objective is even greater than the number attainable with the oblique illuminating conditions shown by FIG. 1B and 1E. This results from the fact that the objective lens is viewing the wave front at such a highly oblique angle that the spacing of the wavelets appears foreshortened and so more wavelets can be seen by the objective. This additional increase in resolution is proportional to the sine of the angle between the axis of the oblique illuminating beam and the optical axis 16 of the objective lens means.

Thus, there is an increase in resolution that is related to the amount of lateral displacement of the illuminating beam and there is also an increase in resolution that is related to the angle of the illuminating beam relative to the optical axis. The total increase in resolution is the combined effect of both of these elements.

One of the outstanding features of the present invention is that the illumination beam shift means (i.e. mirror 11) is located off the condenser axis thereby permitting a plurality of such beam shift means to operate within the system simultaneously. Thus, improved resolution over the entire specimen plane can be achieved by utilizing a plurality of illuminating beams positioned to have their respective axes at selected angles to one another.

Referring to FIG. 2, a pair of beam path shift means in the form of mirrors 23 and 24 disposed off the optical axis 13 of condenser 12 permit the system to operate with two independent illuminating beams to the condenser lens means 12. A light beam source means (lamp) 26 directs a light beam 27 along a source beam path 28 that includes the beam path shift means 23. Similarly, a light beam source means (lamp) 29 directs a light beam 31 along a source beam path 32 which includes beam path shift means 24. Mirror 23 shifts the direction of beam path 28 to path 28a which includes condenser 12. Mirror 23 is disposed a distance radially away from the condenser axis 13 and at an angle π relative to its incident light beam 27 which produces the exit beam path 33 from condenser 12 to emerge from the edge of the lens at the maximum angle which passes through the objective 14. Similarly, mirror 24 shifts the direction of beam path 32 to path 32a which includes condenser 12. Mirror 24 operates in precisely the same way as mirror 23 to produce the desired exit beam path 34 from condenser 12.

The relationship of the locations of mirrors 23 and 24 relative to axis 13 is shown in FIG. 2A, but can be different depending on the results desired. For example, the shift means can be disposed in essentially opposing relationship (180 degrees apart) for 3-D viewing purposes as shown in FIG. 2A, or at essentially right angles (90 degrees apart) as shown in FIG. 2B to achieve the best overall resolution for a two beam system. Resolution over the entire specimen plane is improved by increasing the number of beams. A three beam system as shown in FIG. 2C, where the beam shift means 30 are evenly angularly spaced (120 degrees apart) about axis 13, provides improved resolution over the entire specimen plane. Increasing the number of beams even further to four (FIG. 2D) or to as many as six (FIG. 2E) will produce even better results. Because of the off axis placement of the beam shift means, numerous other arrangements of mirrors and spacing are possible to meet specific needs.

For purposes of the present invention, the source of light beams 27 and 28 (FIG. 2) can be from separate independent light beam sources as shown, or from a light beam source means providing a single light beam which is split by beam splitting means (not shown) which are well known in the art. More important than the source of the light, are the multiple beams 27 and 31 directed along separate, independent paths to the condenser, and the resultant exit beam paths 33 and 34 which do not fall along the optical axis 16 of the objective lens means 14.

Likewise, while mirrors provide one means of beam shifting, other means exist, such as prisms, and the fact that all such means are not shown does not mean that any of them are excluded from the invention. The present invention, in fact, encompasses an arrangement of separate micro light sources, as could be provided using fiber optics, with the beam shift means comprising mechanical or electromechanical means for positioning and directing these light sources. In all cases, the invention is manifest by separate, independent, light beams directed to the objective lens means along paths that are oblique to the optical axis of the objective lens means.

Additionally, for the purposes of the present invention, the beam shift means is shown to be adjustable in order to accommodate a large variety of different objective lenses. However, with a given objective lens/condenser lens combination, there is no necessity for an adjustable beam shift means, and a fixed or pre-adjusted beam shift system would suffice. Thus, the present invention includes such fixed systems known in the art that will direct light beams into a condenser lens at the appropriate location and angle of orientation.

One of the outstanding features of the multiple beam embodiment of the present invention is the intensity of light available to illuminate the specimen at the specimen plane 20. Unlike prior art devices that create angled light beams, the present invention does not require the use of masks or other light occluding devices. Thus, the present invention makes it possible to utilize virtually all of the light from the light beam source means for illumination of the specimen. While the light beam source means has been shown schematically as a light bulb, it will be understood by those skilled in the art that the light beam source means may include any suitable source of radiation, as well as lens means and other optical devices well known for the purpose of furnishing object illuminating light.

Another important feature of the multiple beam embodiment is that it is able to overcome the anisotropy that is inherent in all oblique illuminating systems known in the prior art. The anisotropy of resolution and sharpness has been discussed above. Another effect of the anisotropy associated with prior art systems is the obvious uneven illumination of the image field. That is, one side of the field of view appears bright while the opposite side appears dark. The introduction in the present invention of multiple beams makes it possible to produce an evenly illuminated field of view.

The utilization in the present invention of a plurality of light beams following different paths to the condenser makes it possible to individually manipulate those beams for a variety of possible results in addition to enhanced resolution. For example, referring to FIG. 2, real time 3-D is achieved by interposing complementary polarizing filters 36 and 37 in beam paths 28 and 32, respectively, together with providing similar eye piece polarizing filters 38 and 39 in binocular eye piece 41 having a pair of viewing lenses 42 and 43. The filters 36 and 37 are denoted by positive and negative symbols to indicate that they could be complementary in a variety of different ways known in the art. They may be plane polarizers oriented with their polarizing axes mutually at right angles. Alternatively, they may be circular polarizers, one of the pair producing left-hand polarization, the other producing right-hand polarization. Yet in another alternative, the filters may be complementary color filters (such as red and green) of either the absorption or dichroic type. The eye piece filters 38 and 39 interact with filters 36 and 37 to selectively limit the light from only one of the light sources 26 and 29 so that the image produced by the light along beam path 33 does not exit the viewing lens 43, and the image produced by the light along beam path 34 does not exit the viewing lens 42.

The overlap of the filtered beams which is possible by adjustment of beam path shift means 23 and 24 creates real 3-D images, and by being able to independently control the direction of the light paths of the beams, it becomes possible to control the parallax angles for left and right images, and thereby control the degree of depth perception in the final image.

An evenly spaced four beam system in which one pair of adjacent beams provides the illumination for one eyepiece and the other pair of adjacent beams provides the illumination for the other eyepiece, provides the advantage of overall high resolution inuring to a system of two beams at right angles, with 3-D viewing. It follows that a six beam system of two pairs of three beams would give even greater resolution for 3-D viewing.

The present invention goes far beyond what can be achieved with a single beam, real time, 3-D system in which the degree of parallax is fixed and there is very little disparity in parallax between the left and right images, especially at the center of the image field. In contrast, with the present invention, the left and right images are independently controlled and the degree of parallax between them can be easily adjusted to match the type of objective being employed and the type of specimen being viewed. In addition, there is another and possibly even more important advantage with the present invention, which is the ability to achieve a greater depth of field without loss of resolution. This is a critical prerequisite for producing a sharp 3-D image.

A microscope utilizing the illumination system of the present invention can use any of the many light beam manipulation devices known in microscopy, such as polarizing filters, aperture stops, collimator, etc. In multiple beam systems of the present invention, these devices can be used to provide beams having different characteristics or those having the same characteristics.

Since resolution is enhanced by oblique illumination primarily along the axis (in both directions) of the illuminating light beam, while being diminished along the axis 90 degrees thereto, a first order approximation of high resolution over the entire specimen plane is achieved using two beams. Adding more beams will further enhance the distribution of high resolution over the specimen plane. However, little is gained by using more than five or six oblique light beams, radially spaced about the optical axis. As can be seen from the previous discussion about the anisotropy of resolution associated with a single oblique beam (FIGS. 1E and 1F), the fall-off in resolution is negligible within 15 degrees or so either side of the axis of each illuminating beam (it is proportional to the cosine of that angle).

By way of example for a three beam system, referring to FIGS. 3, 3A, 3B and 3C, mirror surfaces 45, 46 and 47 are supported on beam shift means 48, 49 and 50, respectively. Each mirror surface is disposed in one of the source beam paths 51, 52 and 53, of light beams 54, 56, and 57, respectively, emanating from light beam sources means 58, 59 and 61. The shift means 48, 49 and 50, as best seen with reference to FIGS. 3A and 3B, are movable along paths 55 that are radial relative to the optical axis 13 of the condenser means 12 (see FIGS. 2 and 3). For purposes of the present invention, the beam shift means are positioned at locations on their paths 55 that place the beam reflecting mirror surfaces 45, 46 and 47 radially outward from the axis 13. As fully described above, varying the location of a mirror (45 for example) along its radial path 55 varies the angle of the beam exit path 66 (see FIG. 3) from condenser lens means 12.

Referring to FIG. 3C, "bright field" illumination is available in the present system by locating one of the mirror surfaces (47 for example) over the optical axis 13 and in a position in which it creates a beam path that travels along the condenser lens means axis 13. The other mirror surfaces can be deployed to provide oblique lighting at the same time or disabled (mirrors moved out of range of the condenser means or associated light beam source means turned off) for standard "bright field" illumination.

Positioning of the shift means 48, 49 and 50 can also result in "dark field" illumination. When the radial location of the mirror surfaces create beam exit paths from the condenser means that are angled to fall outside of the objective aperture, "dark field" illumination is made possible.

Referring to FIG. 3, each mirror surface 45, 46 and 47 is also angularly tiltable relative to its associated source means beam so as to vary the angle of reflectance of its mirror surface. Thus, by tilting a mirror surface, the angle of the beam path from the shift means to the condenser means 12 is varied and, in turn, the location of the exit beam path from the condenser means is varied.

The source means beams 54, 56 and 57 follow source beam paths 51, 52 and 53 to the light path shift means 48, 49 and 50 that are generally normal to the axis 13 of condenser means 12 and evenly angularly spaced about the axis 13 of the condenser 12 and the axis 16 of the objective lens means 14 which axes are shown as being coincident (see FIG. 2). The mirrors 45, 46 and 47 are positionable radially and angularly to establish the direction of the beam paths 62, 63 and 64 to the condenser lens means 12, and thereby control the location and direction of the exit paths 66, 67 and 68 from the condenser means to the objective means.

The practicalities of size and space between the shift means and the condenser lens means 12 makes it very difficult to gather all of the light from the individual beams 54, 56 and 57 and direct it onto condenser lens 12 at precisely the location and angle necessary to achieve the desired exit paths from condenser lens 12. A large field lens 71 (such as a 50 mm f/1.2 camera lens) acts as a precondenser lens means, permitting the gathering of all of the light from the incident beams and the accurate direction of those light beams onto the condenser lens 12. The raising or lowering of the field lens 71 relative to the condenser lens 12 has the effect of sizing the beam on the specimen plane 20 to accommodate low power as well as high power systems.

Furthermore, a field lens aperture (iris stop) 72 can be used to control depth of field and contrast, provided the condenser means 12 is slightly under focused. Prior art systems reduce the condenser lens aperture to increase depth of field, but in doing so, reduce resolution due to a concomitant reduction in the numerical aperture of the light beam exiting the condenser. However, in the multiple beam embodiment of the present invention, the condenser aperture 69 remains fully open while the field lens aperture 72 can be reduced to increase depth of field without a concomitant loss in resolution. This is because the aperture of each illuminating beam is reduced while the overall aperture of illumination that exits the condenser lens is not significantly reduced. The multiple beams illuminate the full condenser aperture and no loss of resolution is experienced.

The interposition of the field lens 71 and iris stop 72 does not interfere with the operation of the present invention since adjustment of the mirror surfaces 45, 46, and 47 continues to control the direction and location of the exit paths of the beams from the condenser lens 12.

Likewise, the interposition in the source beam paths 54, 56 and 57 of such devices as lamp condensers 73, zoom lens 74 (to adjust beam size), and polarizing filters 76 does not interfere with the operation of the present invention and, in fact, highlights one of its major advantages. The use of such light manipulating devices on the light beams either separately (between the light source and the shift means) or together, such as by the field lens 71, the field lens aperture (iris) 72 or a polarizing filter 77 ( between the shift means and an eye piece 78), does not reduce the system's resolution.

Where light sources 58, 59 and 61 are independent (as opposed to a single source split by optical means), they can be varied in intensity to add yet a further investigatory variation.

From the forgoing it is apparent that in order to achieve enhanced resolution, the present invention does not limit the use of well known optical devices for light manipulation nor does it result in operation at low light levels relative to the light provided by the light source means. Thus, the illumination system of the present invention enhances resolution and at the same time makes it possible to create illumination conditions that can satisfy a wide variety of investigation needs.

A multi-beam system of the present invention enjoys enhanced resolution both from an increase in the oblique orientation of the illuminating beams relative to the objective lens means optical axis (increase in orders of wavelets recombined), as well as from an increase in the overall aperture of illumination of the condenser lens due to the additive effect of the multiple light beams that exit the condenser from around its periphery.

When polarizing filters 76 in the source beam paths 54, 56 and 57 from the light source means to the beam shift means are complementary, rotation of polarizing filter 77 in the combined beam between the objective lens means 14 and the eyepiece lens 78 permits rotation of the shadow effect of the oblique lighting on the specimen by effectively attenuating the illumination from one or two of the beams while looking at the effects of the other.

The present invention is independent of any particular mechanical or electrical system for positioning and directing the illuminating beams. This includes systems that may be adjustable or pre-adjusted and fixed, and may utilize mirrors, prisms, fiber optics or other known or unknown devices. Such mechanical systems can take any number of forms known to those skilled in the art. By way of example, such a mechanical arrangement for positioning the mirrors of the shift means is described with reference to FIG. 4.

A shift means 80 includes a mirror 81 affixed to a tilt arm 82 which is rotatably connected by hinge 83 to an "L" shaped mount member 84 which is secured to a car 86 that runs in tracks 87. A cable 88 attached to a tab 89 formed on the end of mount member 84 provides the means for positioning the car 86 on the track 87 and thus the radial position of the mirror 81 relative to an optical axis. A pivot arm 91 is pivotally attached at one of its ends to the tilt arm 82 and at its other end to a slide 92 that runs in a groove 93 in the mount member. A cable 94 affixed to a tab 96 formed in the end of slide 92 positions the slide in its groove and in doing so adjusts the tilt of the tilt arm 82 and the angle of the mirror 81. The use of micrometers (not shown) attached to the ends of the cables 94 and 98 to operate the cables makes it possible to achieve the degree of precision necessary for the invention.

A number of shift means 80 in the same system can be mechanically inter-connected (by means well within the skill of the art) so that their positions will be inter-dependent. That is, the movement of one shift means to a new radial location or the tilting of a mirror to a different angular position will cause corresponding movement in the other shift means. This arrangement sets a fixed relationship between the mirrors and makes it possible to easily assure that all of the beams are substantially identical in their paths through the system other than their circumferential position relative to the objective axis 16.

Where it is desired to be able to vary one beam path without disturbing the others, then the positioning of the shift means is most advantageously mechanically independent. In the preferred embodiment of the invention, the mirror members are selectively mechanically interconnected for unified movement and mechanically unconnected for independent movement. Such a system is capable of satisfying the needs of a wide variety of microscope uses.

The method of the present invention for increasing resolution, sharpness and depth of field in a transmitted light microscope having a condenser lens means with an optical axis, and an objective lens means with an optical axis, which is apparent from the foregoing, constitutes the steps of directing a plurality of independent light beams onto the condenser lens means along paths that are not coincident with the condenser lens means optical axis; and fixing the location and direction of the paths of the light beams to the condenser lens means so that the light beams that exit the condenser lens means are directed along paths that include the objective lens means and are oblique relative the optical axis of the objective lens means. Further, the directions of the paths of the light beams onto the condenser lens means are selected to produce exit paths from the condenser lens that are at the optimal angle relative to the optical axis of the objective lens means that includes the objective lens means.

When the number of beams is two and they are directed along paths that are in opposition to one another (essentially 180 degrees apart), they provide illumination for real-time 3-D viewing. When they are at right angles (90 degrees to one an other), they provide the best overall resolution using just two beams. When the number of beams is three or more, they are preferably radially positioned and spaced about the optical axis of the condenser lens means for the best overall resolution at the specimen plane.

The primary teaching of the invention—multiple oblique beams from a specimen to the objective—is applicable to reflection microscopes as well as transmitted light microscopes where the objective lens acts as a condenser lens to direct illumination onto the specimen from different angles.

Referring to FIG. 5, an objective lens means 101 having an optical axis 102 is optically disposed between a specimen 104 at a specimen support stage 106 and a viewing means 107. The specimen 104 is illuminated by a light beam source means 108 which provides a light beam 109 that travels to the specimen 104 via initial beam path 111 which is shifted by a light beam shift means 112, including a partially silvered mirror 115, to a path 113 that is oblique to the optical axis 102 of the objective lens means 101 and which includes the objective lens means 101. The objective lens means 101 directs the beam 109 onto the specimen 104 along path 114 which is also oblique to the optical axis 102 of the objective lens means 101. The beam 109 reflects off of the specimen 104 along reflection path 116 which is at the same angle relative to the optical axis 102 as the incident beam path 114, and passes through the objective lens means 101 after which it follows path 117 to the viewing means 107 through the partially silvered mirror 115.

The angle and location of the beam path 113 is adjustable by movement of the shift means 112, both angularly 112A and transversely 112T, to permit different size objective lens means 101 to be used and the optimal oblique angle achieved for each. A lamp condensing lens 122 and/or an iris 123 can be disposed in the beam path 111, as can other optical devices commonly used in microscopy and shown in FIG. 3.

The reflected light from the specimen passes through the objective lens means 101 at an oblique angle relative to the optical axis 102 of the objective lens means 101 and, thereby, has all of the advantages described above in connection with the transmitted light embodiment of FIGS. 1B and 1C. As in the case of the transmitted light embodiment, and for the same reasons set out above, the performance of the reflected light embodiment improves when multiple, independent oblique light beams are used.

Referring to FIG. 6, the specimen 104 is illuminated by a second light beam source means 126 which provides a light beam 127 that travels to the specimen 104 via initial beam path 128 which is shifted by a light beam shift means 129, including a half silvered mirror 130, to a path 131 that is oblique to the optical axis 102 of the objective lens means 101 and which includes the objective lens means 101. The objective lens means 101 directs the beam 127 onto the specimen 104 along path 132 which is also oblique to the optical axis 102 of the objective lens means 101. The beam 127 reflects off of the specimen 104 along path 133 which is at the same angle relative to the optical axis 102 as the incident beam path 132, and thus passes through the objective lens means 101 and follows a path 134 to the viewing means 107 through partially silvered mirrors 115 and 130.

The angle and location of the beam path 131 is adjustable by movement of the shift means mirror 129, both angularly 129A and transversely 129T, to permit different size objective lens means to be used and the optimal oblique angle achieved for each. A condensing lens 141 and/or an iris 142 can be disposed in the beam path 128, as can be other optical devices commonly used in microscopy, such as filters.

Thus, as with the transmitted light embodiment of FIG. 2, the specimen 104 is illuminated by multiple, independent light beams that are oblique to the optical axis of the objective lens means and which follow reflection paths to the viewing means that includes the objective lens means and which are oblique to the optical axis of the objective lens means. All of the advantages described above attributable to multiple oblique transmitted lighting pertain equally to the multiple oblique reflected lighting described above.

The incident path (113, and 114) of beam 109 may be the reflected path (133 and 134) of beam 127, and the incident path of beam 127 (131 and 132) may be the reflected path (116 and 117) of beam 109 (as when the two beams are 180 degrees apart).

A two beam system can be arranged with the beams at various angles relative to one another. At right angles (see FIG. 2B), the best overall resolution is achieved for two beams. At between 100° and 180° (see FIG. 7A), the best 3-D is achieved.

By stacking additional light sources and shift means, systems with three, four, six (see FIGS. 7C, 7D, and 7E) or any other number of independent, oblique light beams can be created. When, however, more than one beam is used, and beam splitting devices such as a partially silvered mirrors are stacked as shown in FIG. 6, each of the reflected beams must pass through a plurality of such beam splitters before it reaches the viewing means. It would be preferable to have a system which has multiple beams, but which does not require that they be split multiple times. Such a preferred embodiment is shown in FIGS. 8, 9 and 10 to which the following description makes reference.

A housing 141 extending perpendicular to the axis 142 of a reflection microscope 143 supports a beam shift means 144 having a plurality of adjustable mirrors 146. Each mirror 146 is aligned to receive a beam from a light source means 147 and reflect that beam onto a main beam shift means 149 which includes a partially silvered mirror 151. All beams reflected onto mirror 151 are directed through the objective lens means 148 of microscope 143 onto a specimen 152. The beams reflected off of the specimen and into the viewing means 153 pass through only a single beam splitting device—the partially silvered mirror 151. The shift means 144 directs the beams onto the main shift means 149 at an angle that causes all of the beams reflected onto the specimen to be oblique to the axis 148 (which is also the axis of the objective lens means) both as specimen illumination beams and reflected beams.

While only a dual light beam system with a single main light shift means has been illustrated in detail, a system of three, four, six or more light beams would essentially look the same, except that the number of mirrors 144 and number of light sources 147 would increase.

The embodiment of FIGS. 8, 9 and 10 permits multiple oblique light beams to be used in a reflection microscope to illuminate a specimen without compromising light intensity by having beams pass through multiple beam splitters. By using a pellicle as the main shift means 151, any problems that might arise due to a beam shifting as it passes through a beam splitter in the form of a partially silvered mirror, for example, are avoided.

Superior 3-D viewing is possible when more than one beam is used. The use of the 3-D viewing head described in U.S. Pat. No. 5,539,572, for IMPROVEMENTS IN STEREOSCOPIC MICROSCOPES, permits real time viewing or photographing without the use of filters or choppers.

The use of filters to achieve 3-D viewing is available to the reflection embodiment of the invention in the same way as described above with reference to a transmitted light microscope.

Referring to FIG. 5A, an objective lens means 101 having an optical axis 102 is optically disposed between a specimen 104 at a specimen support stage 106 and binocular eye piece 151 having a pair of viewing lenses 152 and 153 and filters 136 and 137 denoted by positive and negative symbols to indicate that they could be complementary in a variety of different ways known in the art. They may be plane polarizers oriented with their polarizing axes mutually at right angles. Alternatively, they may be circular polarizers, one of the pair producing left-hand polarization, the other producing right-hand polarization. Yet in another alternative, the filters may be complementary color filters (such as red and green) of either the absorption or dichroic type.

The specimen 104 is illuminated by a light beam source means 108 which provides a light beam 109 that travels to the specimen 104 via initial beam path 111 which is shifted by a light beam shift means 112, including a partially silvered mirror 115, to a path 113 that is oblique to the optical axis 102 of the objective lens means 101 and which includes the objective lens means 101.

A filter 135 is disposed in the path 109 between the light source 109 and the objective lens 101 at a conjugate plane 140 of the objective lens aperture (conjugate plane). The filter 135 can be of the half aperture type with each aperture of a different complementary filter, as set forth in detail in my pending application Ser. No. 08/846,412, filed Apr. 30, 1997, for STEREO MICROSCOPE CONDENSER, now U.S. Pat. No. 5,706,128.

Since the time of Cajal, scientists have modified conventional transmitted light microscopes in order to view and record 3-D images (Cajal SA, 1910, Obtencion de estereofotografias con un solo objective de gran abertura. *Anal Soc EspFis Quim* 73:3–12). This can be achieved in a number of different ways, for example, by tilting the specimen on a specially constructed goniometer stage and sequentially photographing the left-tilted and right-tilted views (Ref. Shaw PJ, 1990, Three-dimensional optical microscopy using tilted views. *J Microsc* 158:165–172. Bradl J, Hausmann M, Ehemann V, Komitowski D, Cremer C, 1992, A tilting device for three-dimensional microscopy: application to in situ imaging of interphase nuclei. *J Microsc* 168:47–57). Some methods involve obscuring the left half of the objective aperture to create a right-eye view, followed by obscuring the right half of the objective aperture for the left-eye view (Ref. Inoue S, 1986, *Video Microscopy*. Plenum Press New York). Other methods involve obscuring, sequentially, the left and right halves of the condenser aperture in order to produce left and right images for a stereo pair (Ref. Galbraith W, 1957, A method for high-power stereoscopic microscopy. *Q J Microsc Sci* 98:9–13). Yet another method involves the sequential decentering of the microscope lamp filament from the left side to the right side (Teunis PF, Bretschneider F, Machemer H, 1992, Real-time three-dimensional tracking of fast-moving microscopic objects. *J Microsc* 168:275–288).

Finally, simple polarizing filters (or complementary colored filters) can be used to convert a conventional transmitted light microscope into a real-time 3-D microscope (Inoue, 1986). A light beam passing through the half aperture filter is essentially split into two beams, one passing through one filter and the other through the other filter. In this way, the beams are distinguishable at the viewing means.

The eye piece filters 138 and 139 interact with filter 135 to selectively limit the light from only one of the half apertures being seen by the viewing lens 152, and the image produced by the other half aperture being seen by the viewing lens 153. When these two images are combined, the image of the specimen 104 is seen in 3-D.

Referring to FIG. 6A, the utilization in the present invention of a plurality of light beams following different paths to the objective lens 101 makes it possible to individually manipulate those beams for a variety of possible results in addition to enhanced resolution. For example, real-time 3-D is achieved by interposing complementary polarizing filters 136 and 137 in beam paths 124 and 128, respectively, together with providing similar eye piece polarizing filters 138 and 139 in binocular eye piece 151 having a pair of viewing lenses 152 and 153. The filters 136 and 137 are denoted by positive and negative symbols to indicate that they could be complementary in a variety of different ways known in the art. They may be plane polarizers oriented with their polarizing axes mutually at right angles. Alternatively, they may be circular polarizers, one of the pair producing left-hand polarization, the other producing right-hand polarization. Yet in another alternative, the filters may be complementary color filters (such as red and green) of either the absorption or dichroic type. The eye piece filters 138 and 139 interact with filters 136 and 137 to selectively limit the light from only one of the light sources 108 and 126 so that the image produced by the light along beam path 134 does not exit the viewing lens 152, and the image produced by the light along beam path 131 does not exit the viewing lens 153.

The overlap of the filtered beams which is possible by adjustment of beam path shift means 112 and 129 creates real 3-D images and by being able to independently control the direction of the light paths of the beams, it becomes possible to control the parallax angles for left and right images, and thereby control the degree of depth perception in the final image.

In a microscope equipped with a binocular viewing system, an evenly spaced four beam system (FIG. 7D) in which one pair of adjacent beams provides the illumination for one eyepiece and the other pair of adjacent beams provides the illumination for the other eyepiece, provides the advantage of overall high resolution inuring to a system of two beams at right angles, with 3-D viewing. Where each eye views three beams (see FIG. 7E), even better overall resolution results.

The present invention goes far beyond what can be achieved with a conventional single beam reflection microscope by offering a real-time, 3-D system. In the present invention, the left and right images are independently controlled and the degree of parallax between them can be easily adjusted to match the type of objective being employed and the type of specimen being viewed. In addition, there is another and possibly even more important advantage with the present invention, which is the ability to increase contrast and achieve a greater depth of field without loss of resolution.

The invention having been fully described, it is not to be limited to the details herein set forth, but is of the full scope of the appended claims.

What is claimed is:

1. In a reflection microscope having a viewing means for viewing a specimen in a field of view and having an objective lens with an optical axis and an aperture, the improvement comprising:

light beam source means providing a plurality of independent illuminating light beams each of which passes through the objective lens and illuminates the entire specimen in the field of view, wherein the axis of each of said illuminating light beams follows an illuminating path to the specimen that is oblique to the optical axis of the objective lens, and wherein each of said independent illuminating light beams reflects from the specimen along a reflection path through the objective lens to the viewing means that is oblique to the optical axis of the objective lens and, further, wherein each of said independent illuminating light beams combines with the other said independent illuminating light beams to form an image of the specimen to be viewed; and complementary filters disposed between said light beam source means and the specimen and between the objective lens and the viewing means.

2. The improvement of claim 1 wherein the viewing means for viewing the image formed by said independent illuminating light beams views the entire aperture of the objective lens.

3. The improvement of claim 2 further comprising:

light beam shift means disposed in the illuminating paths of said illuminating light beams.

4. The improvement of claim 3 wherein:

said shift means directs said illuminating light beams from said light beam source means onto the objective lens.

5. The improvement of claim 2 wherein said complementary filters are polarizing filters.

6. The improvement of claim 2 wherein said complementary filters are complementary color filters.

7. The improvement of claim 3 wherein said complementary filters are polarizing filters.

8. The improvement of claim 3 wherein said complementary filters are complementary color filters.

9. The improvement of claim 1 wherein said complementary filters are polarizing filters.

10. The improvement of claim 1 wherein said complementary filters are complementary color filters.

11. In a reflection microscope having a viewing means for viewing a specimen in a field of view and having an objective lens with an aperture and an optical axis, the improvement comprising:

light beam source means;

an illuminating light beam from said source means directed through the objective lens and illuminating the specimen in the field of view wherein the axis of said illuminating light beam follows an illuminating path that is oblique to the optical axis of the objective lens, and further, wherein said illuminating light beam reflects off of the specimen onto the objective lens along a reflection path;

viewing means for viewing the specimen wherein said viewing means views the entire aperture of the objective lens and receives reflected light from the objective lens along a viewing path; and complementary filters between said light beam source means and the objective lens and between the objective lens and the viewing means.

12. The improvement of claim 11 further comprising:

light beam shift means disposed in the path of said light beam from said source means.

13. The improvement of claim 12 wherein:

said shift means is in both the illuminating path and the viewing path and includes beam splitting means that reflects light and passes light.

14. The improvement of claim 13 wherein:

said shift means directs said beam along a path that passes through the objective lens.

15. The improvement of claim 11 wherein said complementary filter between said light beam source means and the objective lens is at a conjugate aperture plane.

16. The improvement of claim 11 wherein said complementary filter between said light beam source means and the objective lens is formed by a pair of complementary half aperture filters.

17. The improvement of claim 16 wherein said complementary half aperture filters are located at a conjugate aperture plane.

18. The improvement of claim 17 wherein said complementary half aperture filters are polarizing filters.

19. The improvement of claim 17 wherein said complementary half aperture filters are complementary color filters.

* * * * *